US009531031B2

(12) United States Patent
Shaffer, II et al.

(10) Patent No.: US 9,531,031 B2
(45) Date of Patent: Dec. 27, 2016

(54) BIPOLAR BATTERY ASSEMBLY

(71) Applicant: Advanced Battery Concepts, LLC, Midland, MI (US)

(72) Inventors: Edward O Shaffer, II, Midland, MI (US); Donald Hobday, Kent (GB)

(73) Assignee: ADVANCED BATTERY CONCEPTS, LLC, Midland, MI (US)

( * ) Notice: Subject to any disclaimer, the term of this patent is extended or adjusted under 35 U.S.C. 154(b) by 0 days.

(21) Appl. No.: 14/608,584

(22) Filed: Jan. 29, 2015

(65) Prior Publication Data
US 2015/0140376 A1 May 21, 2015

Related U.S. Application Data

(63) Continuation of application No. 14/345,321, filed as application No. PCT/US2012/033744 on Apr. 16, 2012.
(Continued)

(51) Int. Cl.
*H01M 10/04* (2006.01)
*H01M 2/10* (2006.01)
(Continued)

(52) U.S. Cl.
CPC ....... *H01M 10/0418* (2013.01); *H01M 2/1094* (2013.01); *H01M 2/1223* (2013.01);
(Continued)

(58) Field of Classification Search
None
See application file for complete search history.

(56) References Cited

U.S. PATENT DOCUMENTS

| 3,522,104 A | 7/1970 | Biddick |
| 4,008,099 A * | 2/1977 | Lindstrom .......... H01M 2/0237 429/210 |

(Continued)

FOREIGN PATENT DOCUMENTS

| CH | 248315 A | 4/1947 |
| DE | 2160868 A1 | 6/1973 |

(Continued)

OTHER PUBLICATIONS

Korean Intellectual Property Office Notice of Preliminary Rejection for Application No. 10-2014-7034659 dated Apr. 17, 2015.
(Continued)

*Primary Examiner* — Jonathan G Leong
*Assistant Examiner* — Anne R Dixon
(74) *Attorney, Agent, or Firm* — The Dobrusin Law Firm, P.C.; Norman L. Sims

(57) ABSTRACT

The invention relates to an article comprising: a) one or more stacks of battery plates comprising one or more bipolar plates; b) located between each plate is a separator and a liquid electrolyte; further comprising one of more of the features: 1) c) the one or more stacks of battery plates having a plurality of channels passing transversely though the portion of the plates having the cathode and/or the anode deposited thereon; and d) i) one or more seals about the periphery of the channels which prevent the leakage of the liquid electrolyte into the channels, and/or posts located in one or more of the channels having on each end an overlapping portion that covers the channel and sealing surface on the outside of the monopolar plates adjacent to the holes for the transverse channels and applies pressure on the sealing surface of the monopolar plates.

20 Claims, 10 Drawing Sheets

Related U.S. Application Data

(60) Provisional application No. 61/550,657, filed on Oct. 24, 2011.

(51) Int. Cl.

| | | |
|---|---|---|
| *H01M 2/12* | (2006.01) | |
| *H01M 10/14* | (2006.01) | |
| *H01M 10/18* | (2006.01) | |
| *H01M 6/48* | (2006.01) | |
| *H01M 4/14* | (2006.01) | |
| *H01M 10/28* | (2006.01) | |
| *H01M 4/66* | (2006.01) | |
| *H01M 2/34* | (2006.01) | |
| *H01M 4/02* | (2006.01) | |

(52) U.S. Cl.
CPC ............ *H01M 2/348* (2013.01); *H01M 4/14* (2013.01); *H01M 4/668* (2013.01); *H01M 6/48* (2013.01); *H01M 10/044* (2013.01); *H01M 10/0468* (2013.01); *H01M 10/14* (2013.01); *H01M 10/18* (2013.01); *H01M 10/282* (2013.01); *H01M 2004/029* (2013.01); *H01M 2220/20* (2013.01); *H01M 2300/0011* (2013.01); *Y02E 60/124* (2013.01); *Y02E 60/126* (2013.01); *Y02E 60/50* (2013.01)

(56) References Cited

U.S. PATENT DOCUMENTS

| | | | |
|---|---|---|---|
| 4,098,967 A | 7/1978 | Biddick | |
| 4,510,219 A | 4/1985 | Rowlette | |
| 4,637,970 A | 1/1987 | Yeh | |
| 4,658,499 A | 4/1987 | Rowlette | |
| 4,752,545 A | 6/1988 | Brecht | |
| 4,900,643 A | 2/1990 | Eskra | |
| 5,035,045 A | 7/1991 | Bowen | |
| 5,114,807 A * | 5/1992 | Rowlette | H01M 2/021 429/152 |
| 5,288,565 A * | 2/1994 | Gruenstern | H01M 2/021 429/152 |
| 5,393,617 A | 2/1995 | Klein | |
| 5,429,643 A | 7/1995 | Lund et al. | |
| 5,510,211 A | 4/1996 | Sundberg | |
| 5,582,937 A | 12/1996 | LaFollette | |
| 5,585,209 A | 12/1996 | Feldstein | |
| 5,593,797 A | 1/1997 | Brecht | |
| 5,688,615 A | 11/1997 | Mrotek | |
| 5,800,946 A | 9/1998 | Grosvenor | |
| 5,916,709 A | 6/1999 | Arias | |
| 6,017,653 A | 1/2000 | Petrakovich | |
| 6,077,623 A | 6/2000 | Grosvenor | |
| 6,139,987 A | 10/2000 | Koo et al. | |
| 6,174,337 B1 * | 1/2001 | Keenan | H01G 9/155 29/25.03 |
| 7,275,130 B2 | 9/2007 | Klein | |
| 8,357,469 B2 | 1/2013 | Shaffer, II et al. | |
| 2004/0072074 A1 | 4/2004 | Partington | |
| 2007/0148542 A1 | 6/2007 | Szymborski | |
| 2009/0042099 A1 * | 2/2009 | Tatematsu | H01M 2/1083 429/210 |
| 2010/0183920 A1 * | 7/2010 | Shaffer, II | H01M 2/16 429/210 |

FOREIGN PATENT DOCUMENTS

| | | |
|---|---|---|
| DE | 19608326 A1 | 9/1997 |
| DE | 10058381 A1 | 6/2002 |
| DE | 102004018619 A1 | 11/2005 |
| EP | 1329973 A1 | 7/2003 |
| EP | 1418638 A2 | 5/2004 |
| EP | 1986250 A1 | 10/2008 |
| EP | 2017918 A1 | 1/2009 |
| EP | 2405524 A1 | 1/2012 |
| JP | 51069142 A | 6/1976 |
| JP | 59138076 A | 8/1984 |
| JP | H09045363 | 2/1997 |
| JP | 2000-340265 | 12/2000 |
| JP | 2003249259 A | 9/2003 |
| JP | 2004-095402 | 3/2004 |
| JP | 2005-056761 | 3/2005 |
| JP | 2005259379 A | 9/2005 |
| KR | 10-2001-0097434 | 11/2001 |
| KR | 10-2003-0059930 | 7/2003 |
| KR | 10-0494360 | 6/2005 |
| WO | WO9301624 | 1/1993 |
| WO | 01/03224 A1 | 1/2001 |
| WO | 2007132621 A1 | 11/2007 |
| WO | 2010/100979 A1 | 9/2010 |

OTHER PUBLICATIONS

Korean Intellectual Property Office Notice of Preliminary Rejection for Application No. 10-2014-7010689 dated Apr. 17, 2015.
European Search Report for Application No. EP14200182 dated Apr. 1, 2015.
International search report and written opinion for PCT/US2012/033744 mail dated Sep. 20, 2012.
International Preliminary Report on Patentability for PCT/US2012/033744 dated Jan. 1, 2014.
State Intellectual Property Office of the People's Republic of China for Application No. 201280052008.1 dated May 27, 2016.
European Office Action for Application No. 14200182.5 dated Feb. 1, 2016.
Korean Office Action for Application No. 10-2015-7034625 dated Feb. 18, 2016.
Korean Office Action for Application No. 10-2015-7033939 dated Feb. 18, 2016.
Korean Office Action for Application No. 10-2015-7033939 dated Jul. 1, 2016.
European Office Action for Application No. EP14200182 dated Sep. 13, 2016.

\* cited by examiner

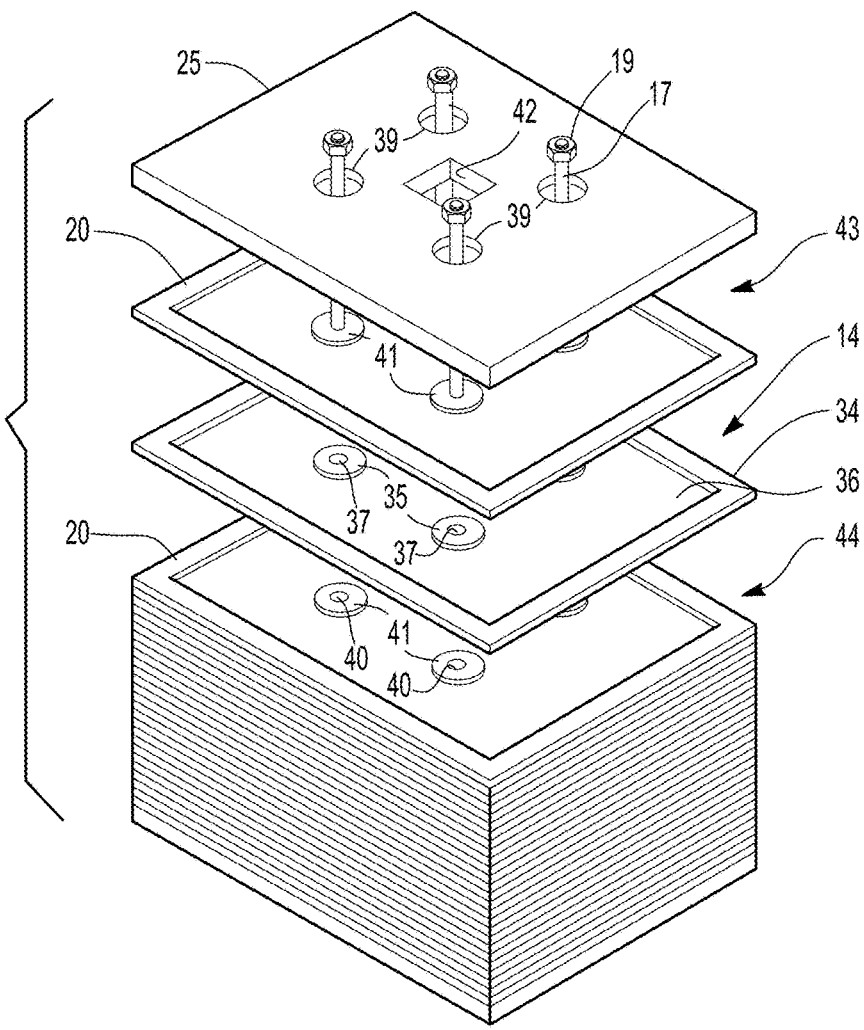
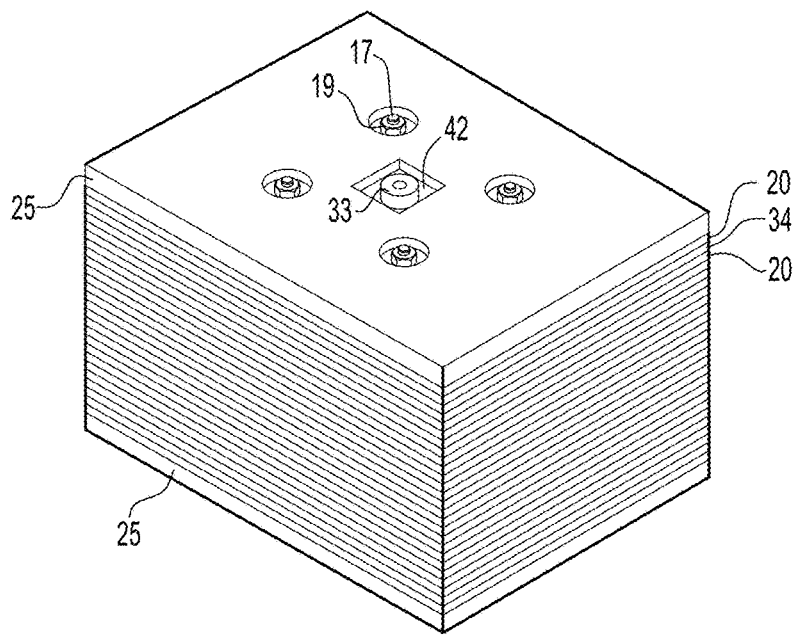

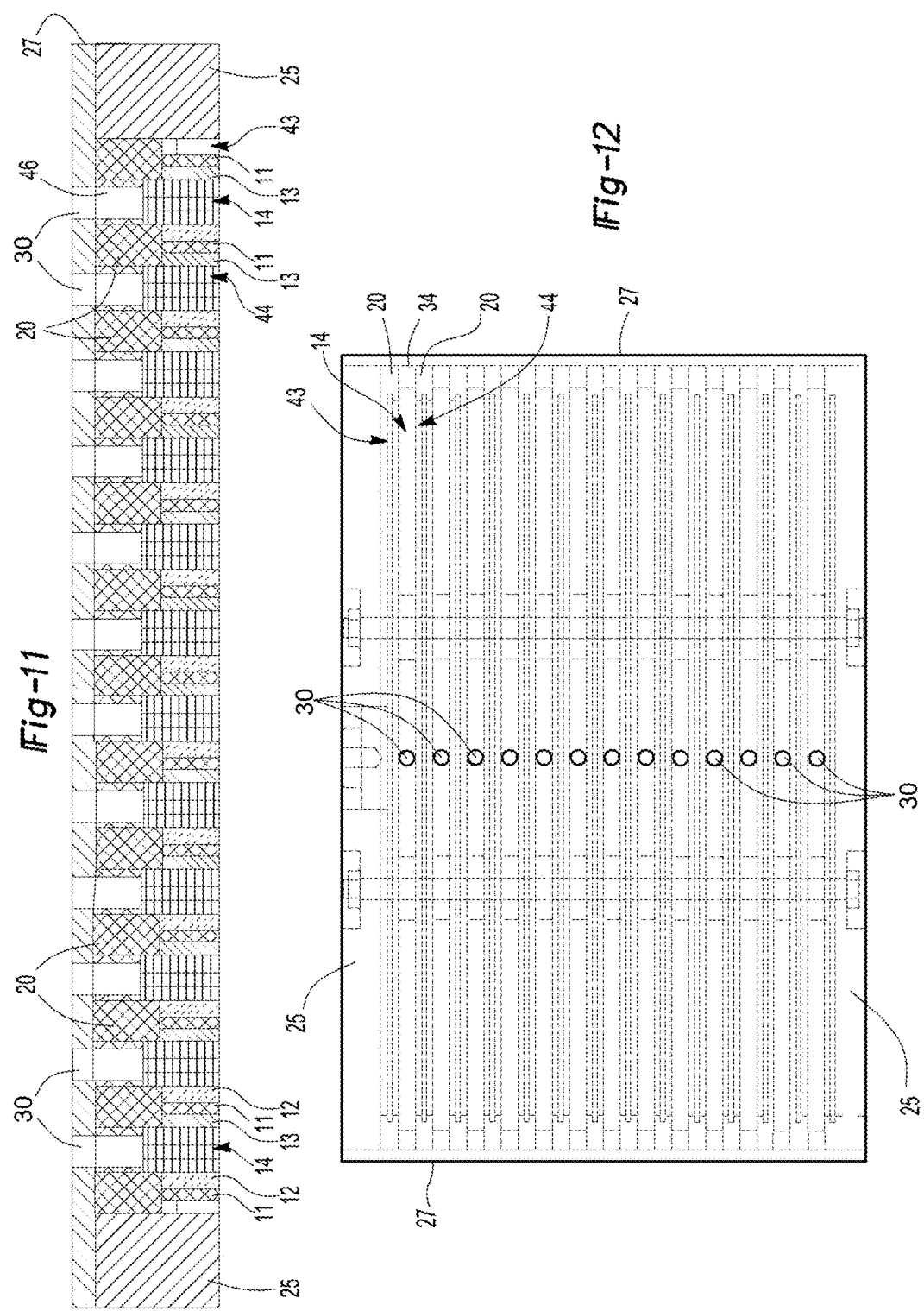

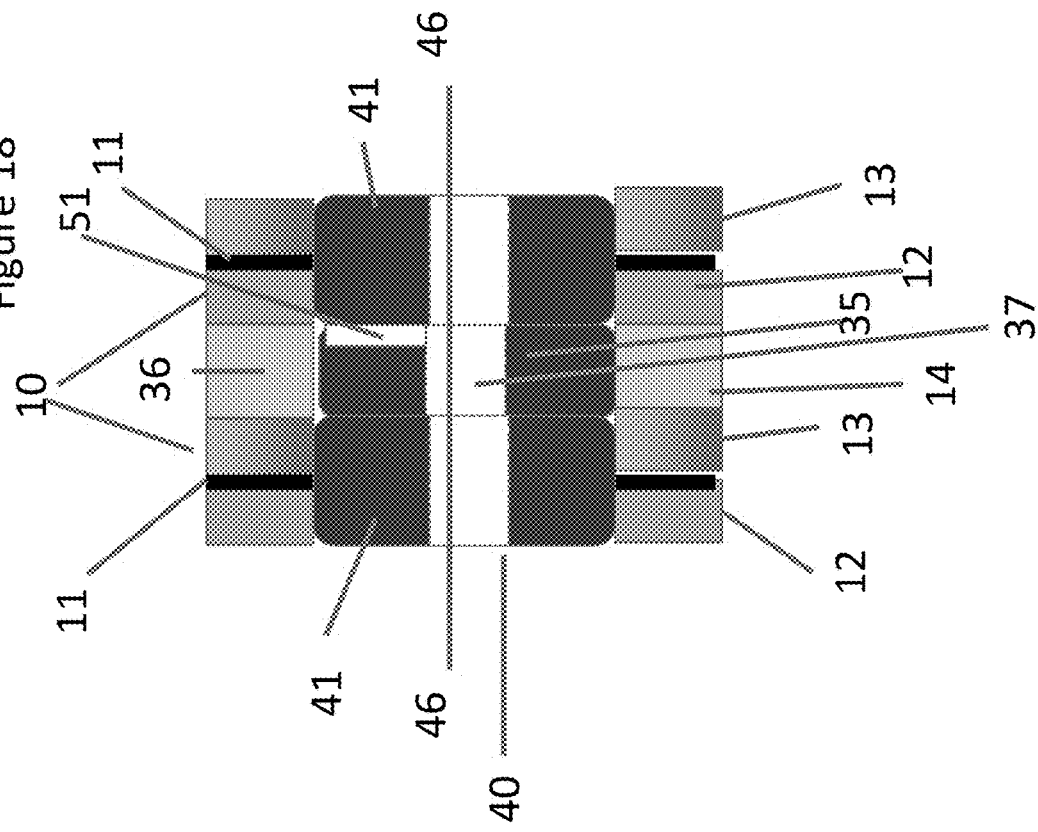
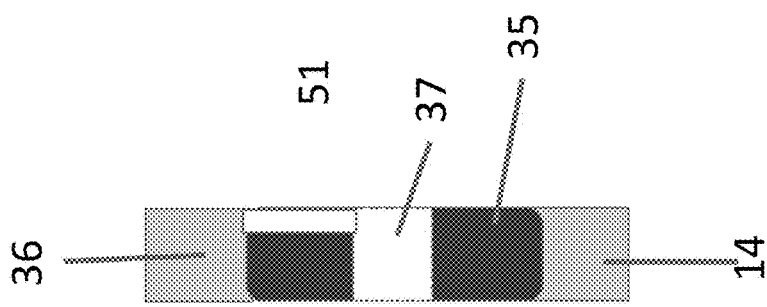

BIPOLAR BATTERY ASSEMBLY

CLAIM OF PRIORITY

This application is a continuation of Ser. No. 14/345,321 filed Mar. 17, 2014 which is a national phase filing of serial number PCT US2012/033744, filed on Apr. 16 2012, which claims benefit of provisional application Ser. No. 61/550,657 filed on Oct. 24, 2011, which are both hereby entirely incorporated by reference for all purposes.

FIELD

The present invention relates generally to a bipolar battery assembly, to methods for the preparation of such assemblies and to methods of using such assemblies.

BACKGROUND

Bipolar batteries are known in the art, see Tatematsu US 2009/0042099, incorporated herein by reference in its entirety. Bipolar batteries provide advantages over other battery designs such as scalability, relatively high energy density, high power density and design flexibility. Bipolar batteries comprise a number of bipolar plates and two monopolar end plates. A bipolar plate comprises a substrate which is in the form of a two sided sheet having a cathodic material, often referred to a Positive Active Material (PAM), on one surface and on the opposite side is an anodic material, often referred to a Negative Active Material (NAM). A conductive sheet may be disposed between the substrate and the anodic material or cathodic material. The bipolar plates are arranged in a stack such that the anodic material of one plate faces the cathodic material of the next plate. In most assemblies there is a battery separator located between the adjacent plates which allow an electrolyte to flow from cathodic material to the anodic material. Disposed in the space between the plates is an electrolyte, which is a material that allows electrons and ions to flow between the anodic and cathodic material. The adjacent surfaces of the bipolar plates with the separator and the electrolyte disposed between the plates form an electrochemical cell wherein electrons and ions are exchanged between the anodic material and the cathodic material. The structure of the battery is arranged such that each cell formed by the bipolar plates is sealed to prevent flow of electrolyte out of the cell. In many designs this is achieved by extending the substrate on all sides beyond the portion on which the cathodic material and anodic material are deposited. The structure used to seal each electro-chemical cell is in contact with the portion of the plates not having anodic or cathodic material on the substrate. In addition the battery separator can extend beyond the portion of the substrate having the anodic and cathodic material disposed thereon to aid in sealing the cells. Each cell has a current conductor connected to the cell to transmit electrons from the cell to one or more terminals from which the electrons are transmitted to a load, in essence another system that utilizes the electrons in the form of electricity. In some embodiments the current conductor in a cell is the conductive sheet which is in contact with additional current conductors which transmit the electrons to the terminals of the battery. At each end of the stack is a monopolar plate having either anodic material or cathodic material disposed on one face. The material on the face of the monopolar plate is selected to form a cell with the opposing face of the bipolar plate at that end of the stack. In particular if the bipolar plate facing the monopolar plate has cathodic material on the face of the plate then the monopolar plate has anodic material on its face and vice versa. In conventional designs the stack of battery plates are disposed in a case which is sealed about the stack of plates and has one or more pairs of positive and negative terminals located on the outside of the battery, each pair connected to a current conductor further connected to one or more cells as described herein.

Despite the advantages of bipolar battery assemblies, the disadvantages of bipolar battery assemblies have prevented them from being commercialized. Bipolar batteries during operation generate significant internal pressures due to expansion and contraction of anodic and cathodic material, gas evolution during the electrochemical process and heat generated. Because bipolar batteries are scalable higher pressures in the cells can be generated. In addition, the heat evolved can exacerbate the pressures generated and can result in runaway reactions which can generate heat levels that damage the materials of construction of the batteries and render the batteries nonfunctional. The pressures can cause the seals about the electrochemical cell to rupture and render the cells and battery nonfunctional. Commonly owned patent application titled BIPOLAR BATTERY ASSEMBLY, Shaffer I I, et al. US 2010/0183920, incorporated herein by reference in its entirety, discloses solutions to these problems through improved edge sealing assemblies and bipolar plate designs.

There are still needs to be addressed before bipolar batteries can be commercialized and the full potential of this technology can be achieved. In particular, bipolar battery designs that handle the heat and pressures generated in operation in an improved manner are needed. Present and future users of batteries often have limited packaging space available for batteries and batteries that can be adapted to available packaging space are needed. Most systems using batteries also desire lighter weight batteries and bipolar batteries which exhibit lower weights are desired. Bipolar battery designs that reduce parts and complexity, such as special parts used for sealing of the electrical cells and separate cases are desired. Methods for battery assembly that are simpler and utilize known manufacturing techniques and achieve the abovementioned goals are needed. Batteries that can be scaled to fit the user needs are needed.

SUMMARY OF INVENTION

The present invention meets one or more of the above needs and is an article comprising: a) one or more stacks of battery plates comprising one or more bipolar plates comprising a substrate having an anode on one surface and a cathode on the opposite surface, a monopolar plate having a cathode deposited on one surface and a monopolar plate having an anode deposited on one surface, wherein the plates are arranged such that the surfaces of the plates having a cathode deposited on the surface face the surface of another plate having an anode deposited on the surface, and the monopolar plates are located at opposite ends of each stack of battery plates; b) located between each plate is a separator and a liquid electrolyte; which further comprises one of more of the following features: 1) c) the one or more stacks of battery plates having a plurality of channels passing transversely though the portion of the plates having the cathode and/or the anode deposited thereon; and d) i) one or more seals about the periphery of the channels which prevent the leakage of the liquid electrolyte into the channels, and posts located in one or more of the channels having on each end an overlapping portion that covers the channel and a sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates, or ii) posts located in one or more channels having on each end a portion that covers the channel and a sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates wherein the posts are fabricated from a material that is capable of withstanding exposure to the electrolyte and wherein the posts prevent the electrolyte from entering the channels; 2) c) a membrane comprising a thermoplastic polymer is disposed about the entire periphery of the edges of the stacks of plates so as to form a seal about the periphery of the edge of the plates which seal prevents the electrolyte from flowing outside of the stacks of plates; 3) the separators are in the form of sheets having adhered to their periphery frames wherein the frames are adapted to be placed adjacent to the periphery of the substrates of the battery plates; and 4) c) an integrated channel communicating with the vent holes in communication with the electrochemical cells. In some embodiments the membrane is formed by welding a sheet of thermoplastic material about the edge of the plates, preferably by vibration or heat welding. In some embodiments the membrane is formed by molding it about the plates, preferably by injection molding.

In some embodiments, the invention is an article comprising: a) one or more stacks of battery plates comprising one or more bipolar plates comprising a substrate in the form of a sheet having an anode on one surface of the sheet and a cathode on the opposite surface, a monopolar plate having a cathode deposited on one surface and a monopolar plate having an anode deposited on one surface, wherein the bipolar plates are arranged such that the surfaces of the bipolar plates having a cathode deposited on the surface face the surface of another plate having an anode deposited on the surface and such that the surfaces of the bipolar plates having an anode deposited face the surface of another plate having a cathode deposited thereon, and the monopolar plates are located at opposite ends of each stack of battery plates; b) located between each plate is an optional separator which is permeable to a liquid electrolyte, capable of passing ions though the separator and preventing electrical shorting between the anodes and cathodes; c) the one or more stacks of battery plates having a plurality of channels passing transversely though the portion of the plates having the cathode and/or the anode deposited thereon; d) i) one or more seals about the periphery of the channels which prevent the leakage of liquid into the channels, and posts located in each channel each having on each end an overlapping portion that covers the channel and sealing surface on the outside of the monopolar plates adjacent to the holes for the transverse channels in the monopolar plates and applies pressure on the sealing surface of the monopolar plates wherein the pressure is sufficient to withstand pressures created during assembly and operation of the cells created by the stacks of battery plates, or ii) posts located in each channel each post having on each end a portion that covers the channel and a sealing surface on the outside of the monopolar plates adjacent to the holes for the transverse channels in the monopolar plates and applies pressure on the sealing surface of the monopolar plates wherein the pressure is sufficient to withstand pressures created during assembly and operation of the cells created by the stacks of battery plates wherein the posts are fabricated from a material that is capable of withstanding exposure to the electrolyte and the posts prevent the electrolyte from entering the channels; e) disposed between each pair of battery plates is a liquid electrolyte; and, wherein the edges of the plates are sealed to prevent the electrolyte from flowing outside of the stack of plates. The article may further comprise one or more seals about the periphery of the transverse channels and the seals comprise membranes disposed on the interior surfaces of the channels. The seals may be formed by bushings located between the holes in the plates along the transverse channels. The articles may preferably comprise seals about the periphery of the transverse channels and the posts comprise any material that has sufficient structural integrity to hold the overlapping portion in place so as to apply pressure to the sealing surface of the monopolar plates. The sealing surface is the portion of the plates in contact with the overlapping portion of the posts. In one aspect of the invention the bipolar plates comprise a polymeric substrate having a plurality of openings passing through the substrate each opening is in communication with both faces of the substrate wherein one or more of such openings is filled with a conductive material which is in contact with both faces of the substrates.

In another aspect the invention comprises an article comprising: a) one or more stacks of battery plates comprising one or more bipolar plates comprising a substrate in the form of a sheet having an anode on one surface of the sheet and a cathode on the opposite surface, a monopolar plate having a cathode deposited on one surface and a monopolar plate having an anode deposited on one surface, wherein the bipolar plates are arranged such that the surfaces of the bipolar plates having a cathode deposited on the surface face the surface of another plate having an anode deposited on the surface and such that the surfaces of the bipolar plates having an anode deposited thereupon face the surface of another plate having a cathode deposited thereon, and the monopolar plates are located at opposite ends of each stack of battery plates; b) located between each plate is a separator which is permeable to a liquid electrolyte, capable of passing ions though the separator and preventing electrical shorting between the anodes and cathodes; c) a membrane comprising a thermoplastic polymer is disposed about the entire periphery of the edges of the stacks of plates so as to form a seal about the periphery of the edge of the plates which seal prevents the electrolyte from flowing outside of the stacks of plates; and d) disposed between each pair of battery plates is a liquid electrolyte. In one preferred embodiment, the membrane is melt bonded to the edges of all of the plates so as to form a seal about the periphery of the plates. In another aspect of the invention, the leading edge and the trailing edge of the membrane are melt bonded to one another wherein the membrane forms a seal about the periphery of the one or more stacks of plates such that electrolytes does not pass from inside of the stack to outside the membrane. In another embodiment the membrane is molded about the stacks of battery plates, preferably the molding is performed by injection molding.

In some embodiments the invention is an article comprising: a separator in the form of a sheet having adhered to its periphery a frame wherein the frame is adapted to be placed adjacent to the periphery of substrate sheets of battery plates. In some embodiments the invention is an article comprising: a) one or more stacks of battery plates comprising one or more bipolar plates comprising a substrate in the form of a sheet having an anode on one surface of the sheet and a cathode on the opposite surface, a monopolar plate having a cathode deposited on one surface and a monopolar plate having an anode deposited on one surface, wherein the plates are arranged such that the surfaces of the plates having a cathode deposited on the surface face the surface of another plate having an anode deposited on the surface, and the monopolar plates are located at opposite ends of each stack of battery plates; and b) one or more separators in the form of a sheet having adhered to its periphery a frame wherein the frame is adapted to be placed adjacent to the periphery of substrate sheets of the battery plates. The articles of the invention may further comprise one or more valves, such as a check valve, adapted to release pressure in the sealed stacks of bipolar plates when the pressure reaches a pressure level which is near but below a pressure at which damage to the article could occur.

The articles of the invention are useful as batteries for the storage of electricity and to generate electricity for use in a variety of environments. The articles of the invention are designed to handle the pressures and heat generated during operation without undue damage to the outside surface of the article and so that the liquid electrolyte is contained in the article. Articles of the invention can be assembled using conventional materials and processes. The articles of the invention are capable of achieving the recited advantages without the requirement of complex sealing structures. The articles of the invention can be adapted to different shaped spaces to accommodate a user's packaging space. The design of the articles of the invention allows scaling the size to deliver a variety of energy needs to the user. Assembly of the articles of the invention is more efficient than assembly of articles known in the art. The article of the invention can withstand pressures of up to about 10 psi, preferably up to about 50 psi and most preferably up to about 100 psi on the end plates of the structure without damaging the end plates.

DESCRIPTION OF THE DRAWINGS

FIGS. 7 and 8 illustrates stacks of battery plates and separator plates.

FIG. 11 shows a partial cut away view of the end of a stack showing the vent holes along line B-B.

FIG. 12 shows a cutaway view of the assembly of FIG. 9 though the vent holes to the electrochemical cells along plane C-C.

FIG. 17 shows a side view of a cut out from a separator having an insert with a vent communicating between the hole and the absorbent glass mat.

FIG. 18 shows a portion of two bipolar plates with a portion of a separator disposed between them with the inserts aligned to form a vent/fill channel.

DETAILED DESCRIPTION

Figure 1:
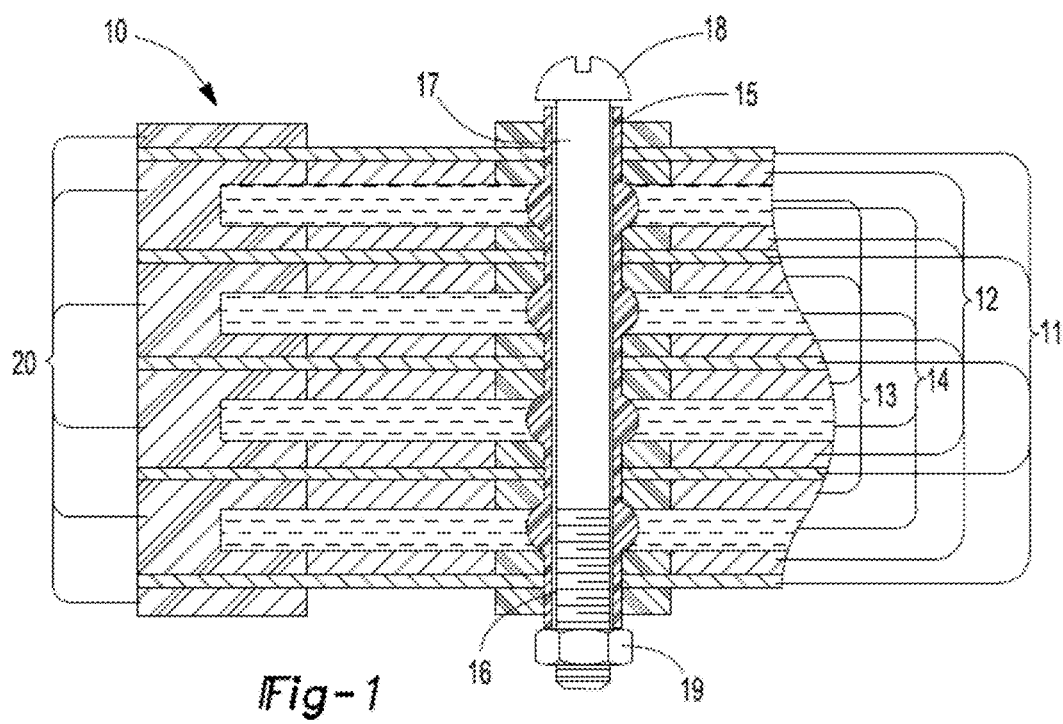
FIG. 1 is a side view of an assembly of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes.

The invention relates to an article useful as a battery comprising on or more stacks of a plurality of bipolar plates, two monopolar plates located on each end of the stack of bipolar plates, having a liquid electrolyte disposed between the bipolar plates; wherein the article further comprises one of more of the following features: 1) c) the one or more stacks of battery plates having a plurality of channels passing transversely though the portion of the plates having the cathode and/or the anode deposited thereon; and d) i) one or more seals about the periphery of the channels which prevent the leakage of the liquid electrolyte into the channels, and posts located in one or more of the channels having on each end an overlapping portion that covers the channel and sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates, or ii) posts located in one or more channels having on each end a portion that covers the channel and a sealing surface on the outside of the monopolar plates adjacent to the holes for the transverse channels and applies pressure on the sealing surface of the monopolar plates wherein the pressure is sufficient to withstand pressures created during assembly and operation of electrochemical cells created by the stacks of battery plates wherein the posts are fabricated from a material that is capable of withstanding exposure to the electrolyte and the posts prevent the electrolyte from entering the channels; 2) c) a membrane comprising a thermoplastic polymer is disposed about the entire periphery of the edges of the stacks of plates so as to form a seal about the periphery of the edge of the plates which seal prevents the electrolyte from flowing outside of the stacks of plates; 3) the separators are in the form of sheets having adhered to their periphery frames wherein the frames are adapted to be placed adjacent to the periphery of substrate sheets of battery plates; and 4) c) an integrated valve and integrated channel communicating with the valve. In some embodiments the membrane is formed by heat welding a sheet of thermoplastic material about the edge of the plates. In some embodiments the membrane is formed by injection molding about the plates. The transverse channels may further comprise seals to prevent the liquid electrolyte from entering the channels or the posts may be chosen so as to also seal the channels so as to prevent the electrolyte from entering the channels. The invention relates to an article useful as a battery comprising a plurality of bipolar plates having a liquid electrolyte disposed between the bipolar plates and a membrane comprising a thermoplastic polymer is disposed about the entire periphery of the edges of the stacks of plates so as to form a seal about the periphery of the stacks of plates which seal prevents the electrolyte from flowing outside of the stacks of plates. The membrane may be applied using conventional techniques such as welding a membrane to the edge of the stack of plates or molding the membrane about the stacks of plates. The invention comprises processes as described herein for the preparation of the articles disclosed herein.

The articles and processes of the invention may further comprise one or more of the features listed below in any combination, including preferences and alternative embodiments disclosed in this application: the substrates of the monopolar and bipolar plates comprise a thermoplastic polymer; a membrane comprising a thermoplastic polymer is disposed about the entire periphery of the stacks of plates so as to form a seal about the edges of the plates which seal prevents the electrolyte from flowing outside of the stacks of plates; the membrane is melt bonded to the edges of all of the plates so as to form a seal about the periphery of the plates; the membrane is molded about the stack of plates; the membrane is injection molded about the stacks of plates; the leading edge and the trailing edge of the membrane are melt bonded to one another wherein the membrane forms a seal about the periphery of the one or more stacks of plates such that electrolytes do not pass from inside of the stack to outside the membrane; the article comprises seals about the periphery of the transverse channels and the seals comprise one or more membranes; the article comprises seals about the periphery of the transverse channels and the seals are formed by bushings located between the holes in the plates along the transverse channels; the article comprises seals about the periphery of the transverse channels and the posts comprise any material that has sufficient structural integrity to hold the overlapping portions in place so as to apply pressure to the sealing surfaces of the monopolar plates; the article comprises seals about the periphery of the transverse channels and the posts comprise any metal that has sufficient structural integrity to hold the overlapping portions in place so as to apply pressure to the sealing surfaces of the monopolar plates; the article does not comprise seals about the periphery of the transverse channels and the posts comprise a material that maintains its structural integrity when exposed to the electrolyte, is nonconductive and seals the transverse channels so as to prevent electrolyte from entering the channels; the posts comprise a ceramic or polymer that exhibits a glass transition or melting temperature above the operating temperature of electrochemical cells formed by the stacks of plates; the posts comprise threading about the outside of the posts, the channels are threaded to receive the posts and the posts fit into the threads of the channels; the overlapping portion is formed by nuts and or bolt heads on the end of the posts; the posts including the overlapping portion comprise one or more thermoplastic polymers and are formed by molding, such as by injection molding; bushings are located adjacent to each hole in each battery plate in a manner such that each transverse channel is sealed through the stack; the bipolar plates comprise polymeric substrates having a plurality of openings passing through the substrates such that each opening in communication with both faces of the substrate wherein one or more of the openings are filled with a conductive material which is in contact with both faces of the substrates; the article further comprises a check valve adapted to release pressure in the sealed stack of bipolar plates when the pressure reaches a predetermined pressure level which is below a pressure at which damage to the article could occur; the posts are injection molded in the transverse channels; the substrates comprise a thermoset polymer with a ribbon of thermoplastic polymer attached about the periphery of the substrates; wherein the one or more stacks of battery plates have e) one or more channels passing transversely though the portion of the plates having cathodes and/or anode pastes deposited thereon; and f) i) seals about the periphery of the channels which prevent the leakage of liquid into the channels, and posts located in each channel each having on each end an overlapping portion that covers the channel and the sealing surfaces of the outside of the monopolar plates which is adjacent to the holes passing transversely through the plates and applies pressure on the outside surface of the monopolar plates wherein the pressure is sufficient to withstand pressures created during assembly and operation of the cells created by the stacks of battery plates, or ii) posts located in each channel each having on each end a portion that covers the channel and applies pressure on the sealing surface of the monopolar plates which is adjacent to the holes passing transversely through the plates wherein the pressure is sufficient to withstand pressures created during assembly and operation of the cells created by the stacks of battery plates wherein the posts are fabricated from a material that is capable of withstanding exposure to the electrolyte and prevents the electrolyte from entering the channels; the seals about the periphery of the channels are formed by injection molding; the separator has a raised surface about its periphery adapted to be disposed adjacent to substrates for battery plates; the separator has one or more holes passing therethrough wherein the holes contain inserts located therein wherein the inserts are adapted to mate with inserts in holes in battery plates to form a channel through a stack of separator plates and battery plates; the separator frames and the inserts are molded to the separators; the separator frames and the inserts are injection molded; wherein the separator frames and the inserts are injection molded as one piece; the substrates for the battery plates have raised surfaces about their periphery adapted to be disposed adjacent to the frames adhered to the separators; wherein the raised surfaces of the substrates and the frame about the separators are disposed adjacent to one another such that the periphery is sealed against a fluid passing into or out of the article; wherein the battery plates and separators have one or more holes passing therethrough wherein the holes align to form one or more channels through the stack of battery plates and separators; wherein the holes in the battery plates and the separators have inserts disposed therein that form one or more sealed channels through the stacks of battery plates and separators; the inserts in the battery plates and the separators are formed by molding; wherein the inserts in the battery plates and the separators are formed by injection molding; the filling or venting channels are integrated in the battery and separator plates; and valves are integrated into the filling or venting channels.

Articles of the invention comprise one or more bipolar electrode plates, preferably a plurality of bipolar plates. Plurality as used herein means that there are more than one of the plates. A bipolar plate comprises a substrate in the form of a sheet having two opposing faces. Located on the opposing faces are a cathode and an anode. In some embodiments of the invention the bipolar plates are arranged in the articles in stacks wherein the cathode of one bipolar plate faces the anode of another bipolar plate or a monopolar plate having an anode and the anode of each bipolar plate faces the cathode of a bipolar or monopolar plate. In the article a space is formed between the adjacent anodes and cathodes wherein the space contains electrolyte which functions with the anode and cathode pair to form an electrochemical cell. The construction of the articles results in closed cells which are sealed from the environment to prevent leakage and short circuiting of the cells. The number of the plates present can be chosen to provide the desired voltage of the battery. The bipolar battery design provides flexibility in the voltage that can be produced. The bipolar plates can have any desired cross sectional shape and the cross sectional shape can be designed to fit the packaging space available in the use environment. Cross-sectional shape refers to the shape of the plates from the perspective of the faces of the sheets. Flexible cross-sectional shapes and sizes allow preparation of articles of the invention to accommodate the voltage and size needs of the system in which the batteries are utilized. Monopolar plates are disposed on the ends of the stacks of plates to form end cells of the stack of plates. The monopolar plates may be prepared from the same substrates and anodes and cathodes used in the bipolar plates. The side of the monopolar plate opposing the anode or cathode can be the bare substrate when another case is used or it can contain a covering useful to protect the stack. In some embodiments the monopolar plates may have one or more terminals passing through the plate from the end cell to the outside. The terminal matches the polarity of the anode or cathode of the monopolar plate. The terminal functions to transmit the electrons generated in the electrochemical cells to the system that utilizes the generated electrons in the form of electricity.

The substrate functions to provide structural support for the cathode and/or the anode; as a cell partition so as to prevent the flow of electrolyte between adjacent cells; cooperating with other battery components to form an electrolyte-tight seal about the bipolar plate edges which may be on the outside surface of the battery; and in some embodiments to transmit electrons from one surface to the other. The substrate can be formed from a variety of materials depending on the function of the battery chemistry. The substrate may be formed from materials that are sufficiently structurally robust to provide the backbone of a desired bipolar electrode plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate plate may be formed from an electrically conductive material, e.g., a metallic material, or can be formed from an electrically non-conductive material. Exemplary non-conductive material include polymers; such as thermoset polymers, elastomeric polymers or thermoplastic polymers or any combination thereof. In some embodiments the non-conductive substrate may have electrically conductive features constructed therein or thereon. Examples of polymeric materials that may be employed include polyamide, polyester, polystyrene, polyethylene (including polyethylene terephthlate, high density polyethylene and low density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized, the composite may contain reinforcing materials, such as fibers or fillers commonly known in the art, two different polymeric materials such as a thermoset core and a thermoplastic shell or thermoplastic edge about the periphery of the thermoset polymer, or conductive material disposed in a non-conductive polymer. In a preferred embodiment the substrate comprises or has at the edge of the plates a thermoplastic material that is bondable, preferably melt bondable. In one embodiment the substrate may have a raised edge about the periphery so as to facilitate stacking of the bipolar plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate are preferably comprised of non-conductive material, and preferably a thermoplastic material. The frame about or integrated onto the separator is preferably comprised of non-conductive material, and preferably a thermoplastic material. The use of non-conductive material enhances sealing the outside of the battery stack.

In some embodiments, the substrate comprises a generally non-electrically conductive substrate (e.g., a dielectric substrate) that includes one or more openings formed therein. The openings may be machined (e.g., milled), formed during fabrication of the substrate (e.g., by a molding or shaping operation), or otherwise fabricated. The size and frequency of the openings formed in the substrate may affect the resistivity of the battery. The openings may be formed having a diameter of at least about 0.2 mm. The openings may be formed having a diameter of about 5 mm or less. The openings may be formed having a diameter from about 1.4 mm to about 1.8 mm. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$. The openings may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium, or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., 230° C., 220° C., 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

Disposed on one surface of the bipolar plates and on some of the monopolar plates is one or more cathodes. The cathode can be in any material that is capable of functioning as a cathode in a battery and can be in any form commonly used in batteries. The cathode is also referred to as positive active material. The positive active material may comprise a composite oxide, a sulfate compound or a phosphate compound of lithium, lead, carbon or a transition metal generally used in a lithium ion, nickel metal hydride or lead acid secondary battery. Examples of the composite oxides include Li/Co based composite oxide such as $LiCoO_2$, Li/Ni based composite oxide such as $LiNiO_2$, Li/Mn based composite oxide such as spinel $LiMn_2O_4$, and Li/Fe based composite materials such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, AgO, NiOOH and the like. The cathode material can be in any form which allows the cathode material to function as a cathode in an electrochemical cell. Exemplary forms include formed parts, in paste form, pre-fabricated sheet or film. For lead acid, batteries the preferred cathode material is lead dioxide ($PbO_2$). Disposed on the opposite surface of the bipolar plates and the other monopolar plate are the anodes. The anodes are also referred to as negative active material. Any anode and anode material may be utilized in the assemblies of the invention. The anode material may include any material used in secondary batteries, including lead acid, nickel metal hydrides and lithium ion batteries. Exemplary materials useful in constructing anodes include lead, composite oxides of carbon or lithium and transition metal, (such as a composite oxide of titanium oxide or titanium and lithium) and the like. A preferred anode material for lead acid is sponge lead. The cathode material can be in any form which allows the cathode material to function as a cathode in an electrochemical cell. Exemplary forms include formed parts, in paste form, pre-fabricated sheet or films. Paste compositions can contain a number of beneficial additives including floc or glass fibers for reinforcement, various ligano-organic compounds for paste stability and conductive additives such as carbon, particularly for negative active materials. For lead acid batteries the preferred form of the anode material is sponge lead. The anode and cathode are chosen to work together to function as an electrochemical cell once a circuit is formed which includes the cells.

The assemblies of the invention further comprise separators. The separators are located between the anode and the cathode in electrochemical cells, more specifically separators are located between the bipolar plates or between a bipolar plate and a monopolar plate. The separators preferably have an area that is greater than the area of the adjacent cathode and anode. Preferably the separator completely separates the cathode portion of the cell from the anode portion of the cell. The edges of the separator preferably contact peripheral edges of the bipolar and monopolar plates which do not have an anode or cathode disposed thereupon so as to completely separate the anode portion of the cell from the cathode portion of the cell. A battery separator functions to partition electrochemical cells; to prevent short circuiting of the cells due to dendrite formation; functions to allow liquid electrolyte, ions, electrons or any combination of these elements to pass through it. Any known battery separator which performs one or more of the recited functions may be utilized in the assemblies of the invention. Preferably the separator is prepared from a non-conductive material, such as porous polymer films, glass mats, porous rubbers, ionically conductive gels or natural materials, such as wood, and the like. Preferably the separator contains pores or tortuous paths through the separator which allows electrolyte, ions, electrons or a combination thereof to pass through the separator. Among more preferred materials useful as separators are absorbent glass mats, and porous ultra-high molecular weight polyolefin membranes and the like.

In some embodiments the articles of the invention further comprise metal sheets or foils. The metal sheets or foils function to disperse the electrons flowing in the electrochemical cell so as to ensure electrical connection of the active materials to the substrate and in some embodiments to function as current collectors. In some embodiments the batteries contain current conductors which transmit the electrons to the positive battery terminals, in those embodiments the metal sheets or foils conduct electrons to the current conductor. The metal sheets or foils can be prepared from any conductive metal, preferred conductive metals are silver, tin, copper and lead. The selection of the metal is influenced by the anode and cathode materials. In a lead acid battery lead sheets or foils are preferred. The metal foils or sheets are preferably located between the anode or cathode and the substrate. The metal sheets or foils may be affixed to the substrate. Any method of affixing the metal sheet or foil to the substrate that holds the metal sheet or foil to the substrate in the environment of the cells may be utilized, such as welding or adhesive bonding. Preferably the metal sheets or foils are adhesively bonded to the substrate. Preferred adhesives useful for this bonding include epoxies, rubber cements, phenolic resins, nitrile rubber compounds or cyanoacrylate glues. Preferably the metal sheets or foils are located between the entire surface of the anode or cathode and the substrate. The metal sheets and foils may cover the entire surface of the substrates. In the embodiment wherein the anode or cathode is in paste form, the paste is applied to the metal foil or sheet. The metal sheet or foil may contact one or more current conductors to transmit electrons to the current conductors. The metal sheets and foils are chosen to be thick enough to disperse electrons flowing through the cells and where appropriate to collect electrons and transmit them to current conductors in the cell. Preferably the metal sheets or foils have a thickness of about 0.75 mm or less, more preferably about 0.2 mm or less and most preferably about 0.1 mm or less. Preferably the metal sheets or foils have a thickness of about 0.025 mm or greater, more preferably about 0.050 mm or greater and most preferably about 0.075 mm or greater.

The stack of components in the assembly of the invention may contain transverse channels passing through the components and the area formed for the electrochemical cells which cells also contain a liquid electrolyte. The stack includes bipolar plates, monopolar plates, separators, anodes, cathodes, optionally metal sheets and any other components of the stack which may be utilized. The transverse channels function to house the posts and some of the channels may be left unfilled so as to function as transverse cooling channels or vent/fill 1schannels. In some embodiments of the invention the channels pass through the anode, cathode and the cell containing the electrolyte. The channels are sealed to prevent electrolytes and gasses evolved during operation from entering the channels. Any method of sealing which achieves this objective may be utilized. The size and shape of the channels can be any size or shape which allows them to house the posts and the posts to support the end plate and edges of the substrates to prevent leakage of electrolytes and gasses evolved during operation and to prevent the compressive forces arising during operation from damaging components and the seal for the individual electrochemical cells. The shape may preferably be round, elliptical or polygonal, such as square, rectangular, hexagonal and the like. The size of the channels is chosen to accommodate the posts used. The channels as a practical matter comprise a series of holes in the components arranged so a post can be placed in the channel formed or so that a fluid can be transmitted through the channel for cooling. The number of channels is chosen to support the end plate and edges of the substrates to prevent leakage of electrolytes and gasses evolved during operation and to prevent the compressive forces arising during operation from damaging components and the seal for the individual electrochemical cells. Preferably a plurality of channels is present so as to spread out the compressive forces generated during operation. The number and design of channels is sufficient to minimize edge-stress forces that exceed the fatigue strength of the seals. The locations of the channels are chosen so as to spread out the compressive forces generated during operation. It is preferable to spread the channels somewhat evenly through the stack to better handle the stresses. Preferably the channels have a cross-sectional size of about 2 mm or greater, more preferably about 4 mm or greater and most preferably about 6 mm or greater. The upper limit on the cross-sectional size of the channels is practicality, if the size is too large the efficiency of the assemblies is reduced. Preferably the channels have a cross-sectional size of about 12 mm or less and most preferably about 10 mm or less.

Located in at least some of the channels are posts which perform one or more of the following functions: hold the stack of components together in a fashion such that damage to components or breaking of the seal between the edges of the components of the stack is prevented, ensure uniform compression across the separator material, and ensure uniform thickness of the separator material. Preferably the posts have on each end an overlapping portion which engages the outside surface of the monopolar end plates. This overlapping portion functions to apply pressure on the outside surface of the monopolar end plates in a manner so as to prevent damage to components or breaking of the seal between the edges of the components of the stack, and prevent bulging or other displacements of the stack during battery operation. The overlapping portion is in contact with a sealing surface, the portion of the end plate in contact with the overlapping portion. In some embodiments the stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack and such length varies based on the desired capacity of the battery. The posts preferably exhibit a cross-section shape and size so as to fill the channel. The number of posts is chosen to support the end plate and edges of the substrates to prevent leakage of electrolytes and gasses evolved during operation and to prevent the compressive forces arising during operation from damaging components and the seal for the individual electrochemical cells, and to minimize edge-stress forces that exceed the fatigue strength of the seals. Preferably a plurality of posts are present so as to spread out the compressive forces generated during operation. There may be fewer posts than channels where one or more of the channels are utilized as cooling channels or vent/fill channels. The posts may comprise any material that performs the necessary functions. If the post is utilized to seal the channels then the material used is selected to withstand the operating conditions of the cells, will not corrode when exposed to the electrolyte and can withstand the temperatures and pressures generated during operation of the cells. Where the posts perform the sealing function the posts preferably comprise a polymeric or ceramic material that can with stand the conditions recited. In this embodiment the material must be non-conductive to prevent shorting out of the cells. Preferably the posts comprise a thermoplastic material as described herein. Preferred thermoplastic materials are ABS, polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. The polymeric materials recited above, ceramics and metals may be utilized. Suitable metals may be steel, brass aluminum, copper and the like. The posts can comprise molded posts, threaded posts or posts with one or more end attachments. Where the parts are threaded the structural parts of the stack are threaded to receive the threaded posts. Posts can have a head on one end and a nut, hole for a brad or cotter pin on the other or may have a nut, hole for a brad or cotter pin on both ends. This is generally the case for non-molded posts. The posts may be constructed in such a way as to be a one way ratcheting device that allows shortening, but not lengthening. Such a post would be put in place, then as the stack is compressed, the post is shortened so that it maintains the pressure on the stack. The post in this embodiment may have ridges that facilitate the ratcheting so as to allow the posts to function as one part of a zip tie like structure. Matching nuts and/or washers may be used with posts so as to compress the plates they are adjacent to when in place. The nuts and/or washers go one way over the posts and ridges may be present to prevent the nuts and/or washers from moving the other direction along the posts. In use the holes in the posts will have the appropriate brads, cotter pins and the like to perform the recited function. If the post is molded is can be molded separately or in place. If molded in place, in situ, a seal needs to be present in the channel to hold the molten plastic in place. A nonconductive post which is threaded may be used and can provide the necessary seal. Alternatively a pre-molded nonconductive polymeric post may be designed to form an interference fit in the channel in a manner so as seal the channels. The posts may be formed in place by molding, such as by injection molding.

When assembled the stack of components, including the bipolar and monopolar plates, form sealed electrochemical cells. Located in the sealed cells is a liquid electrolyte. The electrolyte can be any liquid electrolyte that facilitates an electrochemical reaction with the anode and cathode utilized. The electrolyte allows electrons and ions to flow between the anode and cathode. The electrolytes can be water based or organic based. The organic based electrolytes useful herein comprises an electrolyte salt dissolved in an organic solvent. In lithium ion secondary batteries, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more. The organic solvent should be compatible with the separator, cathode and anode and the electrolyte salt. It is preferable to use an organic solvent that is not decomposed even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as γ-butyrolactone; sulfolane; 3-methylsulfolane; dimethoxyethane, diethoxyethane, ethoxymethoxymethane and ethyldiglyme. These solvents may be used alone or in combination of two or more. The concentration of the electrolyte in the liquid electrolyte should preferably be 0.3 to 5 mol/l. Usually, the electrolyte shows the highest conductivity in the vicinity of 1 mol/l. The liquid electrolyte should preferably account for 30 to 70 percent by weight, and especially 40 to 60 percent by weight of the electrolyte. Aqueous electrolytes comprise acids or salts in water which enhance the functioning of the cell. Preferred salts and acids include sulfuric acid, sodium sulfate or potassium sulfate salts. The salt or acid is present in a sufficient amount to facilitate the operation of the cell. Preferably the concentration is about 0.5 weight percent of greater based on the weight of the electrolyte, more preferably about 1.0 or greater and most preferably about 1.5 weight percent or greater. A preferred electrolyte in a lead acid battery is sulfuric acid in water.

The articles of the invention may comprise a seal between the transverse channels and the post. The seal may be located in the channel, about the exterior of the channel or both. The seal may comprise any material or form that prevents electrolyte and gasses evolved during operation from leaking from the electrochemical cells. The seal can be a membrane, sleeve or series of matched inserts or bosses in the plates and/or separators or inserted in the channel. The membrane can be elastomeric. The channel can be formed by a series of inserts or bosses, inserted or integrated into the plates and/or separators. The inserts may be compressible or capable of interlocking with one another to form a leak proof seal along the channel. The inserts may be formed in place in the battery plates and/or separators, such as by molding them in place. Preferably the inserts are molded in place by injection molding. The sleeve can be prepared from any material that can withstand exposure to the electrolyte, operating conditions of the electrochemical cells and forces exerted by inserting the post or by the post in the channel. The preferred polymeric materials that those that are described as useful for the posts and the substrates. In another embodiment the seal is formed by sleeves or bushings placed between the bipolar and monopolar plates. The sleeves can relatively rigid and the bushings will generally be elastomeric. The sleeves and\or bushings may be adapted to fit within indentations in the bipolar and monopolar plates or to have ends that insert into the holes of the plates creating the transverse channels. The bipolar and monopolar plates can be formed or machined to contain matching indents for the sleeves and/or the bushings. Assembly of the stack of plates with the sleeves or bushings may create interference fits to effectively seal the channels. Alternatively the sleeves or bushings may be melt bonded or adhesively bonded to the plates so as from a seal at the junction. Alternatively the sleeves may be coated in the inside with a coating which functions to seal the channel. As mentioned above the posts can function to seal the channels. It is contemplated that a combination of these sealing solutions may be utilized in single channel or in different channels. The components of the stack of plates, including monopolar plates and bipolar plates, preferably have the same shape and common edges. This facilitates sealing of the edges. Where separators are present they generally have a similar structure as the battery plates to accommodate the formation or creation of the transverse channels. In another embodiment the seal may be a thermoset polymer, such as an epoxy, polyurethane or acrylic polymer injected between the bolt and the transverse channel. The sealing surface of the plate may be modified to improve sealing when compression is applied by the posts. The sealing surface may be smoothed, contoured, roughened or surface treated. A smooth surface will have large contact area from which to make an electrolyte tight seal without defects that allow liquid flow. Contours such as concentric ring(s), ridge(s) or undulations cause areas or "rings" of high pressure contact to resist the flow of liquid electrolyte. The ridge may be filled with a gasket material such as a deformable flat sheet or o-ring to facilitate liquid sealing. Rough sealing surfaces of a deformable material can compress to form reliable liquid electrolyte seal. Surface treating the sealing surface to make it incompatible to wetting by the liquid electrolyte will prevent liquid electrolyte flow into the channel. If a hydrophilic electrolyte is used the sealing surface can be made hydrophobic. Likewise, if a hydrophobic electrolyte is used the sealing surface should be hydrophilic.

The edges are sealed to prevent leakage of the electrolyte and evolved gasses from the cells and isolate the individual cells to prevent short circuiting of the cells. The edges can be sealed using any known battery sealing method. In some embodiments the edges of the assembly are sealed using the endo or exoskeleton sealing systems disclosed in commonly owned patent application, Shaffer, I I et al. Bipolar Battery Assembly, US 2010/0183920 A1 incorporated in its entirety herein by reference. The sealing system disclosed in Shaffer, I I et al. contemplates unique structures for a bipolar battery laminate structure, such as structures described above. The structures, whether from the above methods or not, generally comprise a first separator frame; a negative pasting frame member having one or more edges and a supporting grid structure extending between the one or more negative pasting frame edges; a negative current collector foil; a substrate having a plurality of openings formed therein; a positive current collector foil; a positive pasting frame member having one or more edges and a supporting grid structure extending between the one or more positive pasting frame edges and a second separator frame. The first separator frame may include one or more edges. The negative pasting frame member may have one or more edges so that at least one edge of the negative pasting frame member is in planar contact with at least one edge of the separator frame. The substrate may also have one or more edges so that at least one edge of the substrate is in planar contact with at least one edge of the negative pasting frame member. The positive pasting frame member may have one or more edges so that at least one edge of the positive pasting frame member is in planar contact with at least one edge of the substrate. The second separator frame may have one or more edges so that at least one edge of the separator frame is in planar contact with at least one edge of the positive pasting frame member. The planar contact of the edges of the separator frames, the negative and positive pasting frame members and the substrate form an external seal on the battery so that an electrolyte introduced therein will not leak from within the battery. The edges of the pasting frame members may further include openings for receiving alignment pins or support members located on the edges of the separator frames. The locating of the alignment pins into the openings on the pasting frame members may further facilitate the forming of the external seal. It also is envisioned that a frame structure may be used by which one or more separator frames and one or more pasting frames, in combination with the substrate, will each lie in planar contact with adjacent frames and/or substrates so that the internal structure of the battery cell creates an external seal that prevents any liquid or gas (air) from escaping the battery. The edges of the pasting frame members may further include openings for receiving alignment pins or support members located on the edges of the separator frames. The locating of the alignment pins into the openings on the pasting frame members may further facilitate the forming of the external seal. Thus, any electrolyte introduced into the battery will be securely maintained without risk of battery leakage and subsequent battery failure. Further, no heavy end plates or external support structures are required to effectively seal the battery. As mentioned above, the pasting frame members may further include support members (e.g., pins) located between the edges of the pasting frame members. The use of support members is just one approach to address the issue of compressive stress and resulting unwanted edge/peeling stress within the battery. These stresses may lead to undesirable battery leakage as discussed above. This use of the support pins within a battery, and the resulting internal approach discussed herein, may therefore be referred to as building a bipolar battery having an endo-skeleton. A feature of using the endo-skeleton build or construction approach (as compared to using an exo-skeleton build approach) to address the undesired effects of compressive stress within the battery, is that it does not result in a reduction of volumetric energy density. Additionally, it is a lightweight approach, using only a few lightweight pins with very little loss of active material. Further, the endo-skeleton build approach has been found to greatly reduce the chances of traditional bipolar battery failure mode caused by edge peeling. Further, if desired, one can add pins on the perimeter or edge of the frame members to align the separating frame member, thereby allowing it to glide up and down or back and forth during compression. If desired, the bipolar battery may be constructed using a combination of an endo-skeleton and exo-skeleton build approach. For example, the bipolar battery can be constructed using internal support pins as described above. In addition to this, a frame structure may also be placed on the terminal side of the monopole. This exterior battery construction may be reinforced with an end cover as part of an aesthetic box. The combined features of an endo-skeleton and an exo-skeleton in such a construction work together to further reduce maximum edge stress and displacement. The bipolar battery may also be substantially free of any exo-skeleton structure. In one embodiment the substrates for the battery plates can have a raised edge about the periphery of the substrates which function as pasting frames to for the cavity containing the electrolyte, and optional separator, to seal against one another and to seal to an outside membrane when utilized.

In another embodiment the edges of the stack of monopolar and bipolar plates may have adhered thereto a membrane. The membrane may be bonded to the edge of the plates by any means that seals the edges of the plate and isolate the electrochemical cells. Exemplary bonding methods comprise adhesive bonding, melt bonding, vibration welding, RF welding, microwave welding among others. The membrane is a sheet of a polymeric material which material can seal the edges of the monopolar and bipolar plates and can withstand exposure to the electrolyte and the conditions the battery is exposed to internally and externally. The same materials useful for the substrate of the bipolar plates may be utilized for the membrane. Preferably the membrane is a thermoplastic polymer that can be melt bonded, vibration welded or molded about the substrates of the monopolar and bipolar plates. Preferably the same thermoplastic polymer may be utilized for the monopolar and bipolar substrates and the membranes. Particularly preferred materials are polyethylene, polypropylene, ABS and, polyester, with ABS most preferred. The membranes may be the size of the side of the stacks to which they are bonded and the membranes are bonded to each side of the stack. In this embodiment the edges of the adjacent membranes are preferably sealed. The edges can be sealed using adhesives, melt bonding or a molding process. The membranes may comprise a single unitary sheet which is wrapped about the entire periphery of the stack. The leading edge of the membrane, first edge contacted with the stack, and the trailing edge of the stack, end of the membrane sheet applied, are preferably bonded to one another to complete the seal. This may be performed by use of an adhesive, by melt bonding or a molding process. In melt bonding the surface of the membrane and/or the edge of the stack are exposed to conditions at which the surface of one or both becomes molten and then the membrane and the edge of the stack are contacted while the surfaces are molten. The membrane and edge of the stack bond as the surface freezes forming a bond capable of sealing the components together. In a preferred embodiment the membrane is taken from a continuous sheet of the membrane material and cut to the desired length. The width of the membrane preferably matches the height of the stacks of monopolar and bipolar plates. The membrane has sufficient thickness to seal the edges of the stack of monopolar and bipolar sheets to isolate the cells. In a preferred embodiment the membrane also functions as a protective case surrounding the edges of the stack. Preferably the membrane has a thickness of about 1 mm or greater, more preferably 1.6 mm or greater and most preferably 2 mm or greater. Preferably the membrane has a thickness of about 5 mm or less, more preferably 4 mm or less and most preferably 2.5 mm or less. In the embodiment wherein the membrane is bonded to the edge of the stack, any adhesive which can withstand exposure to the electrolyte and the conditions of operation of the cell may be used. Among preferred adhesives are plastic cements, epoxies, cyanoacrylate glues or acrylate resins. Alternatively, the membrane may be formed by molding a thermoplastic or thermoset material about a portion of, or all of, the stack of battery plates. Any known molding method may be used including thermoforming, reaction injection molding, injection molding, roto molding, blow molding, compression molding and the like. Preferably the membrane is formed by injection molding the membrane about a portion of or all of the stack of battery plates. Where the membrane is formed about a portion of the stack of the plates it is preferred that the membrane is formed about the edges of the battery plates or battery plates and the separator.

The sealed stack may be placed in a case to protect the formed battery. Alternatively the membrane in conjunction with a protective covering over the monopolar plates at the end of the stack may be used as a case for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of battery plates and/or the opposite sides of the monopolar plates.

In some embodiments the separators have integrated frames. The frames function to match with the edges of adjacent battery plates and to form a seal between the electrochemical cells and the outside of the battery. The frame can be attached to the separator about the periphery of the sheet forming the separator using any means that bonds the separator to the frame and which can withstand exposure to the electrolyte solution, for example by adhesive bonding, melt bonding or molding the frame about the periphery of the separator. The frame can be molded in place by any known molding technic, for example thermoforming, injection molding, roto molding, blow molding, compression molding and the like. Preferably the frame is formed about the separator sheet by injection molding. The frame may contain a raised edge adapted to match raised edges disposed about the periphery of the substrates for the battery plates. Raised edges in one or both of the battery plate substrates and the frames of the separators can be matched to form a common edge for the battery stack and to enhance the seal between the electrochemical cells and the outside of the battery. As discussed hereinbefore the separators may have inserts integrated into the separator wherein the inserts function to define the transverse channels through the stack. The inserts may be formed by any known means and are preferably molded in place, preferably by injection molding. Where a separator has both inserts and a frame both parts can be molded in one step, for instance by injection molding.

The assemblies of the invention may further comprise one or more conductive conduits adapted to transmit electrons from the metal sheets or foils, often called current collectors, to the positive terminal. A typical bipolar battery flows electrons from cell to cell through the substrate. Either the substrate at least partially comprises a conductive material or comprises conductive pathways through the substrate. When the circuit is closed that contains the cells electrons flow from cell to cell through the substrate to the positive terminal. It is contemplated that the assemblies of the invention may flow electrons through the substrates and cell, through a current collector to a current conductor or both.

The assembly of the invention preferably contains one or more pairs of conductive terminals, each pair connected to a positive and negative terminal. The terminals are adapted to connect each battery stack to a load, in essence a system that utilizes the electricity generated in the cell. The terminals are in contact with the conductive conduits in the assemblies. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. Alternatively the assemblies of the invention can contain a single check valve which releases pressure from the entire assembly when or before a dangerous pressure is reached.

The assemblies of the invention are attached to a load and a circuit is formed which includes the cells. Electrons are flowed to the terminals and to the load, a system using the electricity. This flow is maintained as long as the cells can generate electricity. If the stack of cells becomes fully discharged the battery needs to undergo a charging step before additional use. If the substrate for the bipolar plates contains an electrically conductive material admixture at an operating temperature of the battery assembly that is below its phase transformation temperature, the substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path. This allows the disabling of the battery before untoward consequences occur. Once a battery is discharged it may be recharged by forming a circuit with a source of electrons. During charging the electrodes change function and the anodes during discharge become cathodes and the cathodes during discharge become anodes. In essence the electrochemical cells flow electrons and ions in opposite directions as compared to discharge.

The assembly of the invention may be prepared by the following steps. The substrate for the bipolar plates and monopolar is formed or cut to shape. If the substrate comprises a nonconductive material and a traditional bipolar battery is being assembled, the substrate needs to be converted to a composite substrate. Means of achieving this is by forming holes through the substrate by any known means, such as molding them in or machining the substrate to from the holes. The openings are filled with conductive material, preferably conductive material that melts at a defined temperature as described hereinbefore. If utilized the metal sheets or foil is adhered to one or both of the faces of the substrate. Preferably the metal sheets or foil are bonded to the substrate using an adhesive as described hereinbefore, preferably a nitrile based rubber cement. The cathode and anode are attached to the substrate or the metal sheets or foil. The attachment is facilitated using any standard cathode or anode attachment method. Where the cathode and anode are used in a paste form, the paste is applied to the substrate or to the metal sheet or foil. In this embodiment the paste is allowed to dry. Preferably the holes for the transverse channels are preformed or machined into the substrate, metal sheets or foil, separator, anode, cathode and any other component present. Where the channels are formed using sleeves, inserts or bosses and the like, they are inserted into the battery plates and/or the separators. Where the inserts are a molding in place they are molded in place using known molding processes. The components are then stacked such that for each plate an anode faces a cathode of another plate. Preferably the sheets are stacked so that the edges of the substrates are aligned along with the edges of any other frame components. In one embodiment a plate with two or more guide pins or bolts is used to support the stack. The components are stacked on the plate with the guide pins in an appropriate order consistent with the disclosure herein. Two or more of the transverse channels may be used for the alignment pins or bolts. Once the stack is completed, elastomeric membranes or plastic sleeves may be inserted into the transverse channels. If the channel is sealed with bushings or plastic sleeves located between the holes in the plates a coating may be applied to the interior of the channel, interior of the holes, sleeves and/or bushings. If the interior of the holes of the plates need to be threaded they are threaded either prior to assembly or after assembly using known techniques. Thereafter posts are inserted into the stack and secured by the overlapping portion to the sealing surface of the opposing side of the monopolar plates. Where the overlapping portion is a mechanical attachment structure, such attachment structure is secured to the post. Where the post is injection molded in place, molten thermoplastic material is inserted into the channels and an overlapping portion of the molten material is formed on the sealing surfaces at both ends. Preferably the surface of the channels is heated to melt the surface of the inside of the channels, in this embodiment the injected thermoplastic material bonds well to the inside of the channel. The thermoplastic material is allowed to cool. In another embodiment the channel may have a form inserted into the channels and a form for the overlapping portion of the formed at each end. A two-part thermoset material is then added to the channels and allowed to cure to form the post. Where the post is designed to fit into the channel by interference fit the post is inserted with appropriate force. Once the posts are secured and stable, the stack is removed from the guide pins and posts can be inserted into the channels used for the guide pins.

In the embodiment where a membrane is applied to the edge surface of the stack, an adhesive is applied to either or both of the membrane or the edge of the stack and the membrane and the edge of the stack are contacted so as to bond them together. The membrane may be held in place while the adhesive sets or cures using known mechanical means. The edges of the membrane can be sealed to the unsealed edges of other membrane sheets or membranes or end plates on the opposite surface of the monopolar plates. The sealing can be performed by an adhesive or by melt bonding. Alternatively the membrane can be attached by melt bonding. In melt bonding both the edge of the stack and the surface of the membrane to be bonded to the edge are exposed to conditions such that the surface melts without negatively impacting the structural integrity of the membrane or the stack. This can be achieved by contacting each with a hot surface, platen, hot fluid, air, radiation, vibration and the like, then contacting the membrane and edge of the stack along the melted surface and allowing the molten surfaces to cool and bond together. The membrane may be cut to fit a particular edge or can be a continuous sheet which is wrapped around the edge of the stack. In this embodiment the leading edge and the trailing edge of the membrane are bonded together where they meet, preferably by melt bonding. The membrane may be sealed to the membrane or endplate on the outside surface of the monopolar plates, where present. Where a case is used the assembly may be inserted into case. Preferably the membrane functions as a case. In the melt bonding embodiment, the membrane and edge of the stack are exposed to a temperature or condition at which the surface of each is melted, becomes molten, for a time sufficient to melt the surface of each. The temperature chosen is preferably above the melting temperature of the material used in the membrane and/or the substrate and any other structural components. Preferably the temperature used is about 200° C. or greater, more preferably about 220° C. or greater and most preferably about 230° C. or greater. Preferably the temperature used is about 300° C. or less, more preferably about 270° C. or less and most preferably about 240° C. or less.

The frames and/or inserts may be molded into or onto the separators or the battery plate substrates using the following steps. The separator sheets are cut to size (die punch, slit, stamped, etc). One or more sheets are stacked to meet the required thickness. The sheets are placed into a mold that places the sheets into a fixed position. The mold forms the periphery frame around the separator and any internal features about the transverse channels (e.g. bushings) as required. Further the mold is designed to not overly compress the separator material and to prevent plastic from damaging the separator material. Plastic is the injected into the mold and once the plastic is cooled the part is ejected.

The membrane may be molded about a portion of or all of the battery stacks utilizing the following steps. Components of the battery are stacked in appropriate order (end plate, monopolar plate, separator, bipolar plate, etc). The stack alignment can be assured by using the guide rods through the transverse holes of each stacked component. The stacked assembly is then transferred into the mold which consists of a positive mold cavity, a negative mold cavity, an insert mold cavity for the body of the battery (alternatively slide doors could be used as is common in injection molding) and retractable guide pins located in either the negative mold cavity or the positive mold cavity. The stacked assembly is transferred onto the retractable guide pins to ensure and maintain alignment. The mold is then closed which compresses the assembly. Plastic is then injected to form the outer membrane of the battery sealing to the components and end plates. The guide pins are then retracted and a second shot of plastic is injected filling the transverse channels and securing the injected plastic to the end plates. Once cooled the battery is ejected from the mold.

The assembly may further comprise one or more vent holes leading into one or more of the electrochemical cells. Preferably a vent hole is in contact with each electrochemical cell. Preferably the vent holes are located in the battery separators for each cell. In another embodiment the assembly of the invention may comprise a manifold. Preferably the one or more vent holes are in contact with the manifold and the manifold forms a common head space for all of the vent holes. Preferably the manifold has one or more ports formed therein where one or more valves, such as a check valve, may be placed in the manifold ports. The battery may further comprise a fill valve. Preferably the fill valve is located in the manifold. The article of the invention may further comprise one or more integrated filling and/or venting channels. Such a channel is formed near the edge of a battery stack and is in communication with the area between the cathode and anode where the separator is located, this is the area that forms the electrochemical cell when electrolyte is added to the area. The channels can be formed by forming holes in the separators and battery plates before assembly and then aligning the holes. Inserts, sleeves or bosses may be used as discussed with respect to the transverse channels as long as the channels communicate with the area adapted for use as electrochemical cells. Preferably the channels communicate with the outside of the battery stack in two places. This facilitates filling of the battery with electrolyte. After filling of the electrochemical cells with electrolyte one of the openings can be filled or closed. The other opening is used to vent the battery and the electrochemical cells. During filling a vacuum is pulled on one external hole and electrolyte is drawn in through the other hole. Alternatively a single hole is used and the electrochemical cells are filled as described herein after. A valve, such as a check valve, pop valve, pressure relief valve and the like, may be inserted into the remaining hole after filling. The channel can be pre-threaded or tapped after assembly of the stack.

After assembly, vent holes may be drilled if necessary through the sealed membrane into each cell centrally located on the thickness of the absorbent glass mat separator. A manifold is then attached to the top of the battery assembly forming a common head space above the vent holes. In the manifold a single port may be fabricated. The single manifold port may be used as a vacuum purge port and an electrolyte fill port. Vacuum is applied to the manifold port via vacuum pump to low pressures, such as about 29 inches Hg, then the vacuum source valve is turned off, the fill valve is connected to a source of electrolyte is opened allowing electrolyte to fill all cells of the battery simultaneously. In some embodiments, vent holes are formed in the frames about the separator when the frames are fabricated or molded. In some embodiments an integrated vent channel is formed by predrilling or forming holes in the frames of the separators and the substrates used for the battery plates. These holes can be aligned to form a channel. Preferably this channel communicates with the vent holes communicate with the electrochemical cells. In some embodiments the integrated vent channel can be one of the transverse channels wherein the transverse channels have a vent communicating with each of the electrochemical cells. This can be achieved by providing a membrane or insert in the transverse channel with vent holes for each electrical chemical cell. In another embodiment the channel may be formed from inserts or bosses which have vent holes or form vent holes which communicate with the electrochemical cells. The integrated channels may be pressurized to prevent backflow of electrolyte. The integrated channel may be terminated with a valve to control the internal pressure of the assembly. Before use the channel by be used to fill the electrochemical cells with electrolyte. In one preferred embodiment the valve is located on one of the end plates. The channel can be threaded after assembly or can be pre-threaded prior to assembly for insertion of a valve. The valve can be inserted and retained using any known means for insertion and retention. Some of the components used in the articles disclosed herein are adapted to be disposed adjacent to other components disclosed. Components that are designed to be located to other components may have or utilize components or techniques known in the art for retaining the parts in the appropriate relationship to one another. The particular components or techniques used to retain components in relationship to one another are selected based on the components, relationship and design preferences of the skilled artisan designing or assembling the assemblies of the invention.

The assemblies of the invention preferably can withstand internal pressures of 100 psi or greater without leaking or warping due to the internal pressures, preferably about 50 psi or greater, even more preferably about 20 psi or greater and most preferably about 10 psi or less. Preferably the assemblies can withstand internal pressures of about 6 to about 10 psi. The assemblies of the invention preferably provide an energy density of about 38 watt hours per kilogram, more preferably about 40 watt hours per kilogram and most preferably about 50 watt hours per kilogram. The assemblies of the invention can generate any voltage desired, such as 6, 12, 24, 48 and 96 volts. The voltage can be higher although about 200 volts is a practical upper limit.

Figure 2:
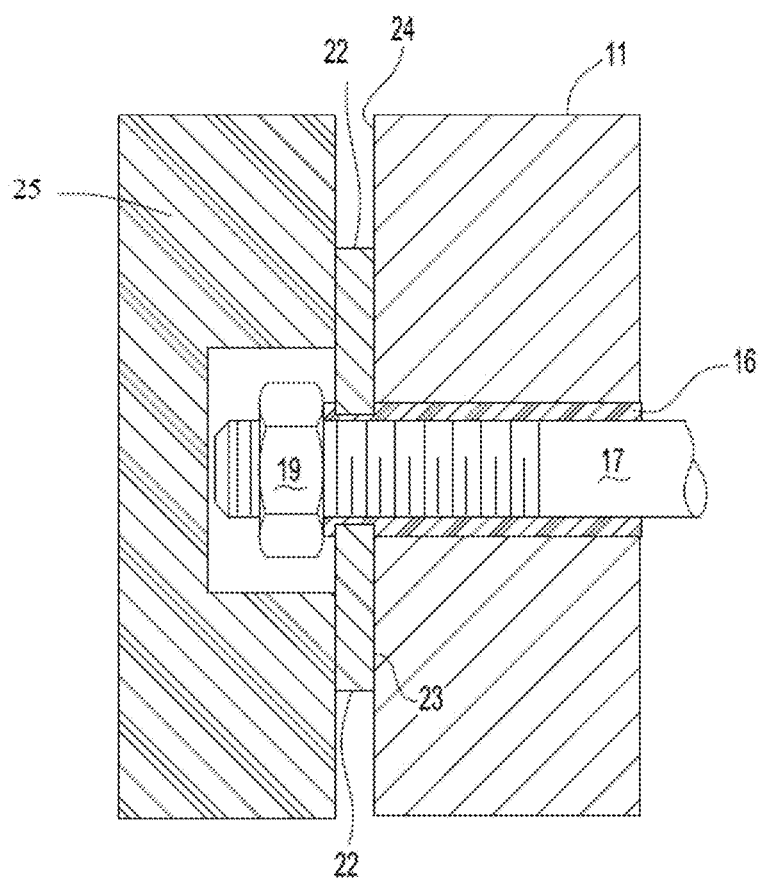
FIG. 2 is side view of an assembly of the invention having an end plate over a bolt in a transverse channel.

The following figures illustrate some embodiments of the invention. FIG. 1 shows a side view of a stack of bipolar plates 10. Shown are a number of monopolar and bipolar plate substrates 11. Adjacent to each bipolar plate substrate 11 are anodes 12 and cathodes 13. Disposed between the anodes 12 and the cathodes 13 of each cell is a separator 14 comprising an absorbent glass mat having electrolyte absorbed therein. Also shown is a channel seal 15 comprising a rubber tube disposed in a transverse channel 16. In the transverse channel 16 inside the rubber tube of the channel seal 15 is a post 17 in the form of a threaded bolt. At the end of the posts 17 are overlapping portions in the form of bolt heads 18 and nuts 19. About the edge of the substrates of the monopolar 43 and bipolar plates 44 are frames 20. FIG. 2 shows an end plate 25 disposed over the end of the opposite surface of the substrate 11 of a monopolar plate 43. A seal 22 is placed between the nut 19 on the bolt post 17 and the sealing surface 23 on the monopolar plate opposing surface 24.

Figure 3:
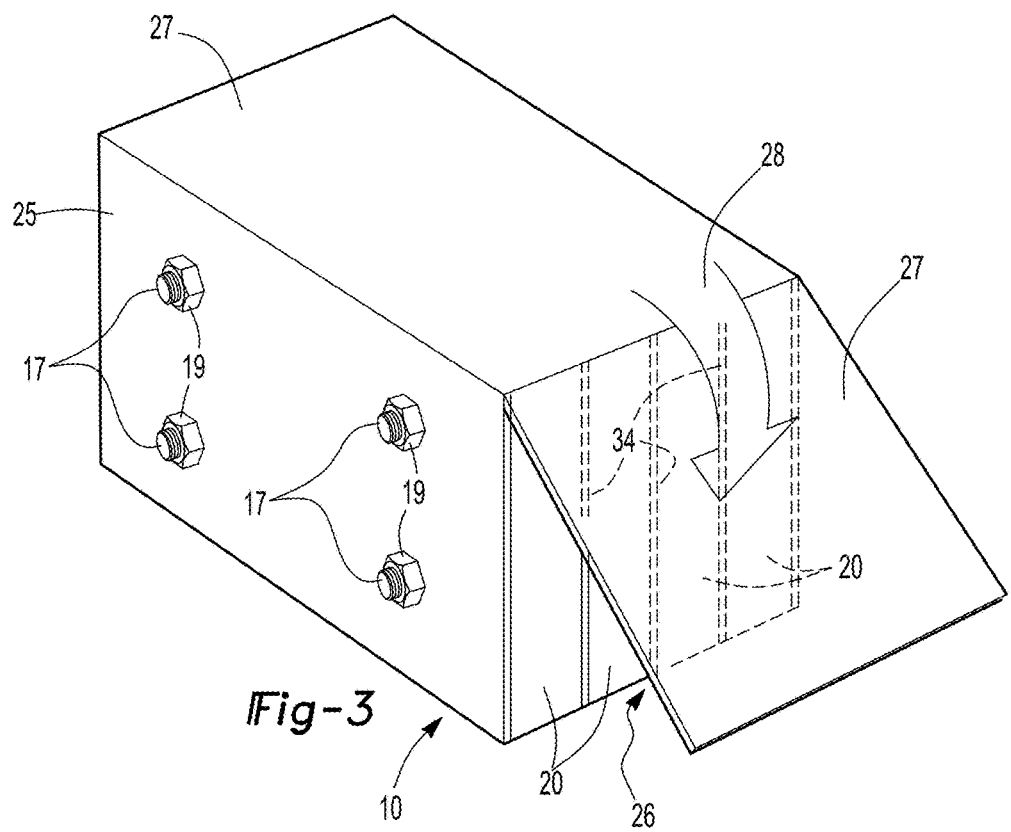
FIG. 3 is a side view of an assembly with a membrane disposed about the stack of bipolar plates.
Figure 4:
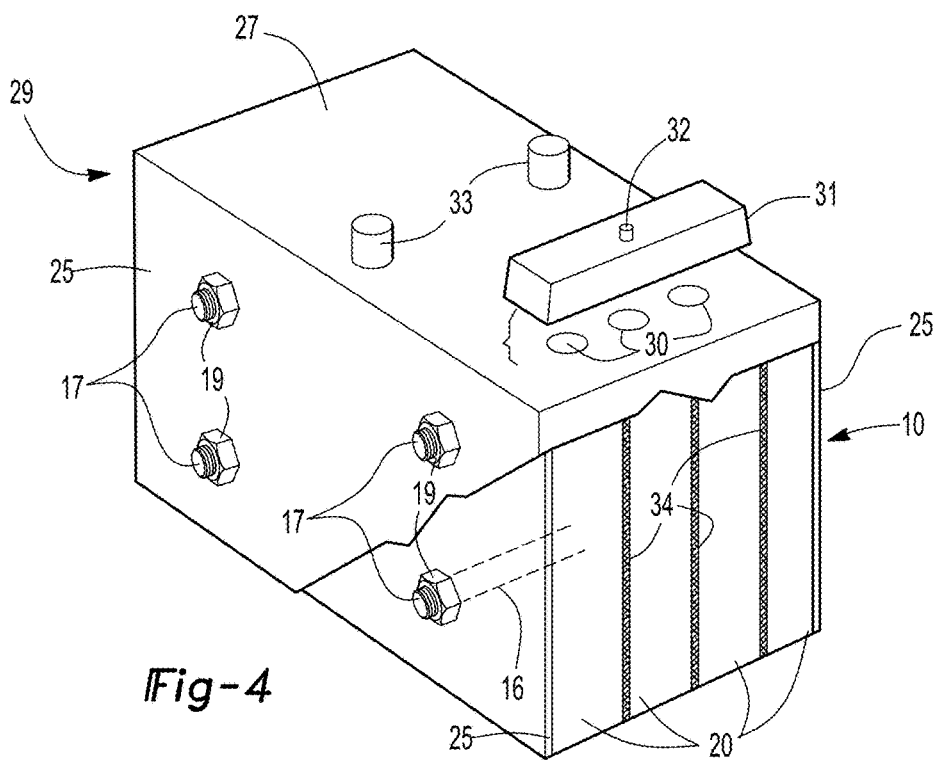
FIG. 4 shows an assembly of the invention with a manifold and a check valve.

FIG. 3 shows applying a membrane about the edge of a stack of bipolar substrates. An end plate 25 is shown with four nuts 19 spaced apart on the end of bolt posts 17. End plates 25 are shown on each end of the stack. Disposed about the substrates 11 are frames 20. Between the substrate frames 20 are the separator frames 34. A membrane 27 is being applied to the substrate frames 20 and the separator frames 34 using a source of heat 26 and pressure 28 to seal the membrane 27 to the edge of the stack of substrates frames 20 and separator frames 34. FIG. 4 shows a bipolar battery 29 comprising battery plate stack 10 having substrate frames 20 interspersed with separator frames 34. Shown are end plates 25, one showing four nuts 19 spaced apart. Also shown are vent holes 30 drilled into the cells, a manifold 31 adapted to cover the vent holes 30 and form a common head space for the vent holes 30. Also shown is a check valve 32 disposed on the manifold 31 in contact with the common head space, not shown. Also shown are two terminal posts 33 which are the negative and the positive terminals for the bipolar battery 29.

Figure 5:
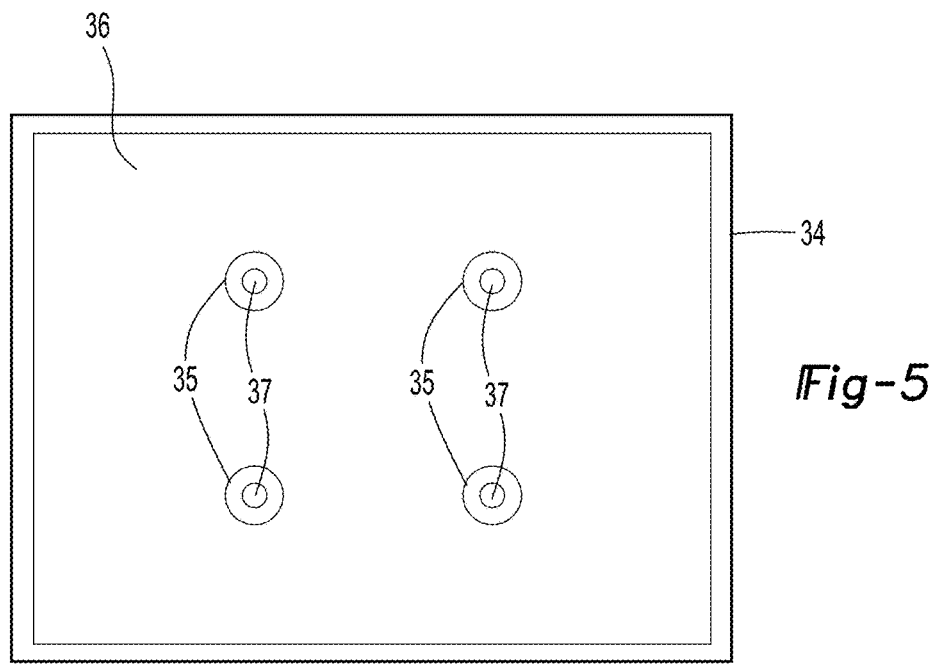
FIG. 5 illustrates a separator sheet of the invention.
Figure 6:
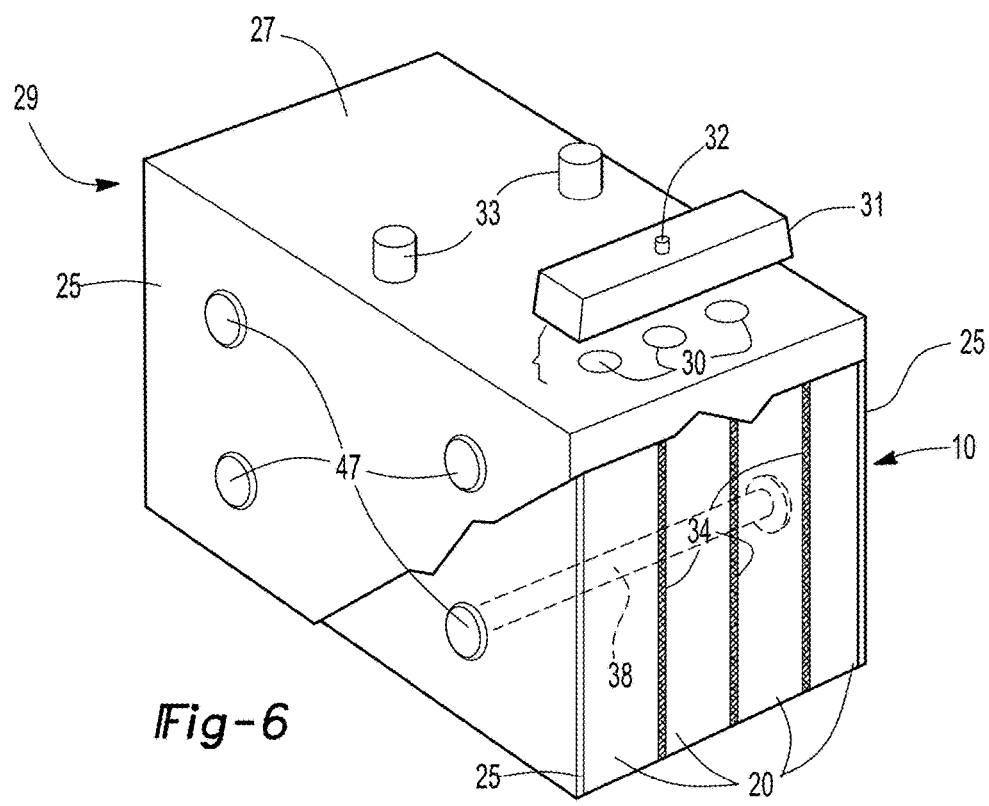
FIG. 6 illustrates another embodiment of an assembly of the invention wherein posts are injection molded into the transverse channels.

FIG. 5 shows a separator 14, a molded integrated frame 34 and four molded in inserts 35. The molded inserts 35 are located about molded insert holes 37 adapted to form part of the transverse channel 16. The frame 34 is disposed about an absorbent glass mat 36. FIG. 6 shows molded posts 38 and molded heads 47 located on the end plate 25. FIGS. 7 and 8 illustrates stacks of battery plates and separator plates. FIG. 7 shows a partially exploded stack of battery plates and separators. Shown is an end plate 25 having a terminal hole 42 and holes 39 for posts 17 in the form of bolts and nuts 19. Adjacent to the end piece is a monopolar plate 43 having a frame 20 with a raised edge. The monopolar plate 43 has raised inserts 41, that surround holes used to form the transverse channel 16 and post 17 in the holes. Adjacent to the monopolar plate 43 is a separator 14 having a frame 34 about the periphery and an adsorbent glass mat 36 comprising the central portion. Molded inserts 35 surrounding molded insert holes 37 for forming the transverse channels are shown. Adjacent to the separator 14 is a bipolar plate 44 having a frame 20 about the periphery which has a raised surface, raised inserts 41 which are raised to form the transverse channel 16. The raised inserts 41 form raised insert holes 40 for the transverse channel. FIG. 8 shows the stack of battery plates and separators. Shown are end plates 25, battery plate substrate frames 20, separator frames 34, posts 17, nuts 19 about the posts 17. A terminal hole 42 in the end plate 25 has a battery terminal 33 located therein.

Figure 9:
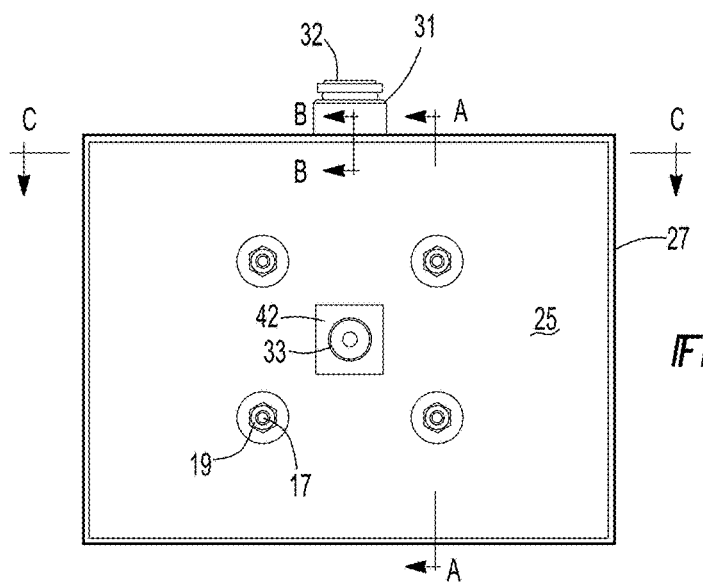
FIG. 9 shows another embodiment of an assembly of the invention.
Figure 10:
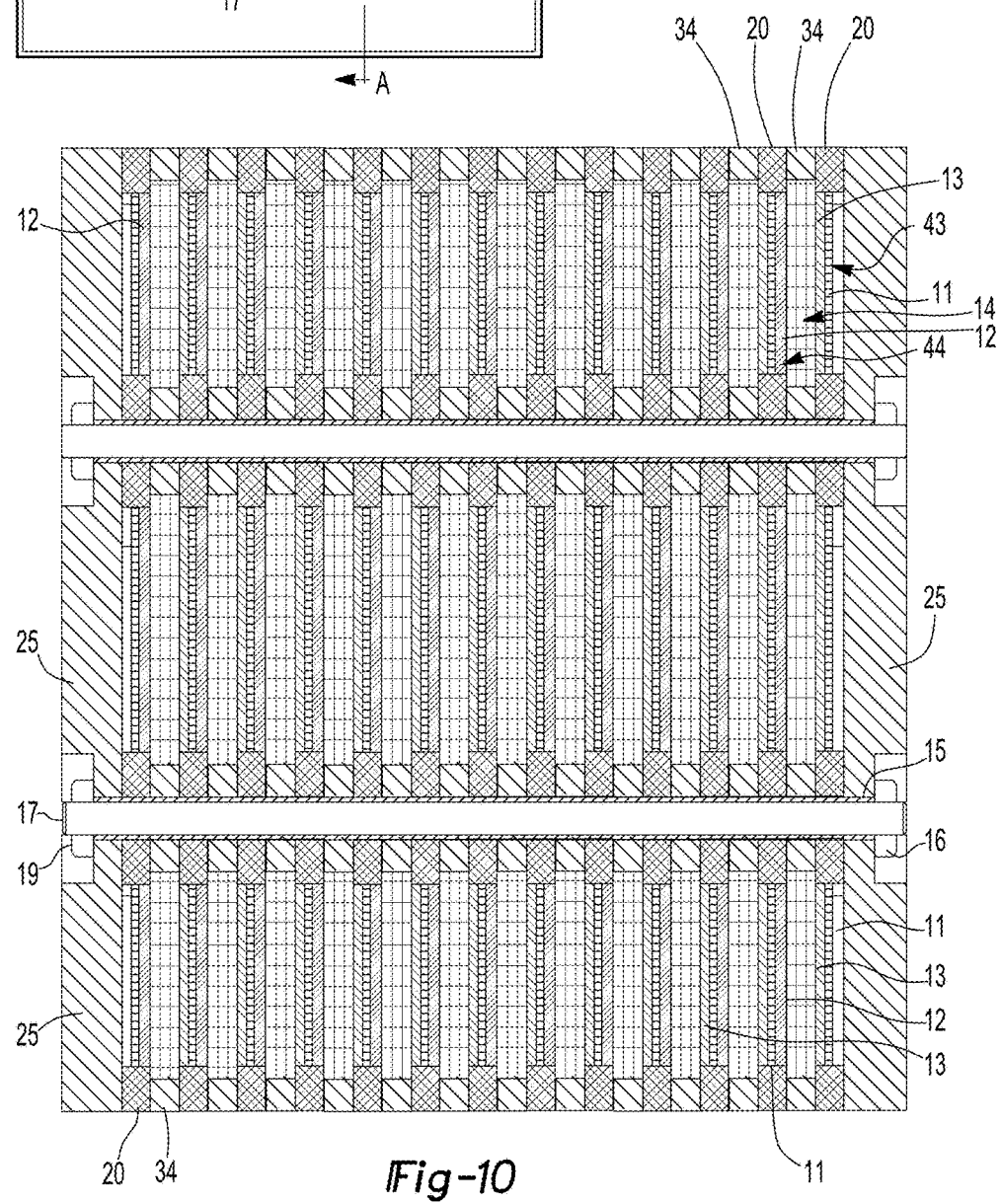
FIG. 10 shows a cutaway view of the assembly of FIG. 9 through a pair of transverse channels along plane A-A.

FIG. 9 shows another embodiment of an assembly of the invention. Shown are posts 17 and nuts 19 on the end plate 25, a terminal hole 42 with a terminal 33 located therein, a manifold 31 and a check valve 32, Disposed about the periphery of the battery is a membrane 27. FIG. 10 shows a cutaway along the plane shown by line A-A through the transverse channels. Shown is a monopolar plate 43 having a substrate 11 and a cathode 13 having a frame 20 at the ends of the substrate 11. Adjacent to the cathode 13 on the monopolar plate 43 is a separator 14 having a frame 34 on each end. Adjacent to the separator 14 is a bipolar plate 44 having an anode 12. The anode 12 is disposed on a substrate 11 and on the opposite surface of the substrate 11 is a cathode 13 and disposed at the end in this view is the frame 20. In this view there are number of bipolar plates 44 arranged as described. Between the bipolar plates 44 are separators 14. At the opposite end of the stack is a monopolar plate 43 having a substrate 11, with a frame 20 shown at the ends in this view and an anode 12 facing the adjacent separator 14. The pairs of battery plates form electrochemical cells with the separators 14 located in the cells. Also shown are the transverse channels 16 having channel seals 15 and posts 17 disposed therein and nuts 19 at the end of the posts 17. FIG. 11 shows a partial cut away view of the end of a stack of the assembly of FIG. 9 showing the vent holes 30 along line B-B. FIG. 12 shows a cutaway view of the assembly of FIG. 9 though the vent holes 30 to the electrochemical cells along plane C-C. Shown are vent holes 30 for each electrochemical cell.

Figure 13:
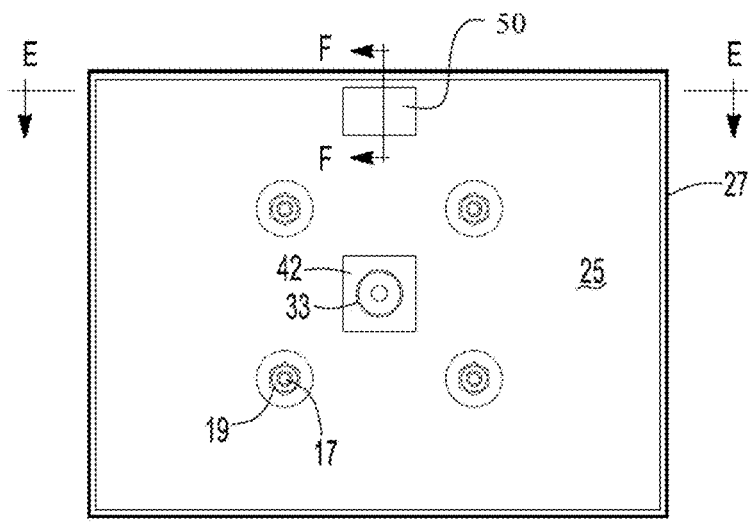
FIG. 13 shows another embodiment of an assembly of the invention with a valve in the end plate of the assembly.
Figure 14:
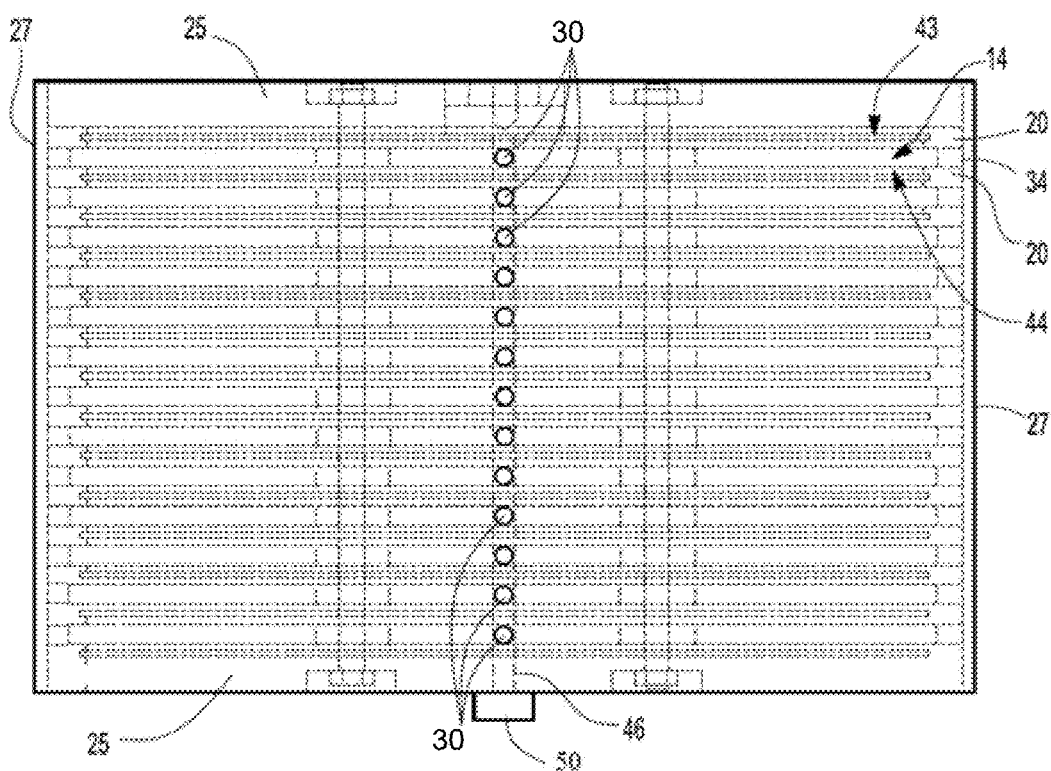
FIG. 14 shows a cutaway view of the assembly of FIG. 13 though an integrated channel in communication with the vent holes to the electrochemical cells along plane E-E.
Figure 15:
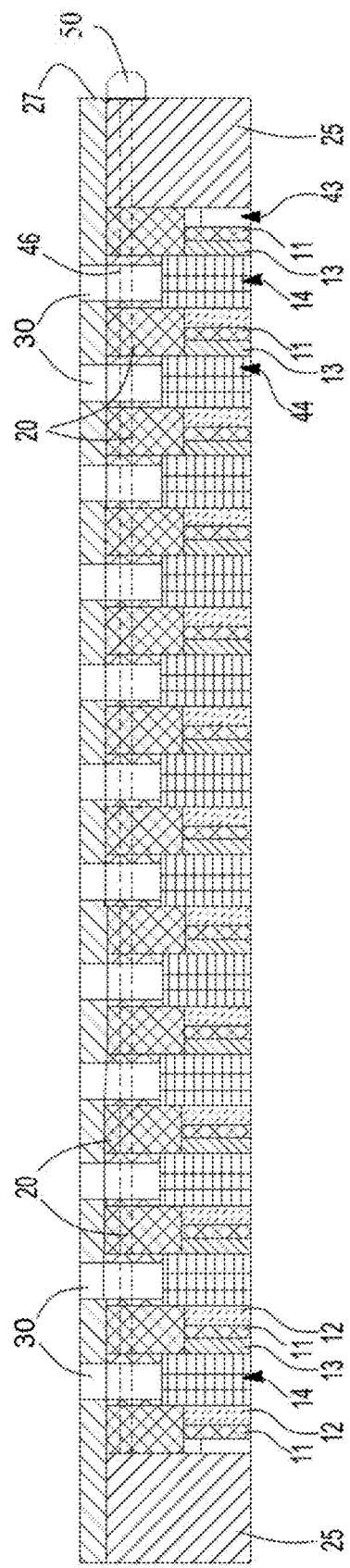
FIG. 15 shows a cutaway view of the assembly of FIG. 13 though an integrated channel in communication with the vent holes to the electrochemical cells along plane D-D.
Figure 16:
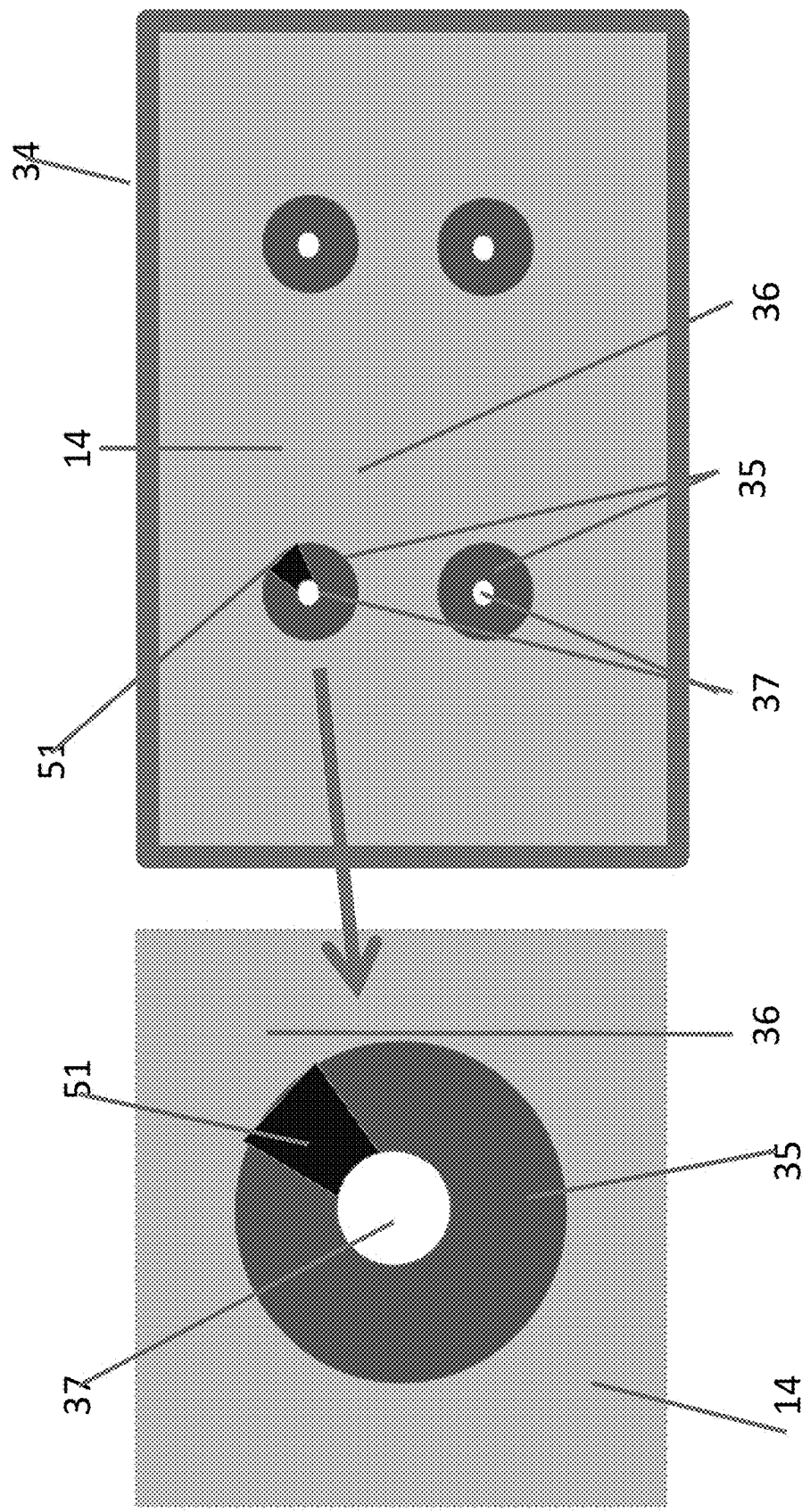
FIG. 16 illustrates a separator having an absorbent glass mat as shown in FIGS. 5 and 7 containing a vent (vent hole).

FIG. 13 shows another embodiment of an assembly of the invention with a valve 50 in the end plate 25 of the assembly. The valve 50 communicates with an integrated channel 46. The integrated channel 46 communicates with the vent holes. FIG. 14 shows a cutaway view of the assembly of FIG. 13 with an integrated channel 46 in communication with the vent holes 30 to the electrochemical cells along plane E-E. The integrated channel 46 communicates with a valve 50 at the end of the stack. FIG. 15 shows a cutaway view of the assembly of FIG. 13 though an integrated channel 46 in communication with the vent holes 30 to the electrochemical cells along plane D-D. FIG. 16 illustrates a separator 14 having an absorbent glass mat 36 as shown in FIGS. 5 and 7 containing a vent (vent hole) 51 in one of the molded in inserts 35 having a hole 37. The vent 51 communicates with between the hole 37 and the absorbent glass mat 36 of the separator. Also shown is the frame 34 about the separator 14. A cut out portion of FIG. 16 shows a close up of the insert 35 having a hole 37 and the vent 51 wherein the vent 51 communicates between the hole 37 and the absorbent glass mat 36 of the separator 14. FIG. 17 shows a side view of a cut out from a separator 14 having an insert 35 with a vent 51 communicating between the hole 37 and the absorbent glass mat 36. FIG. 18 shows a portion of two bipolar plates 10 with a portion of a separator 14 disposed between them. The inserts 47 in the bipolar plates and the separator 35 are aligned so that their holes 40 and 37 respectively are aligned to form a portion of a vent/fill channel 46. Also shown are the substrate plates 11, anodes 12 and cathodes 13 of the bipolar plates.

ILLUSTRATIVE EMBODIMENTS

The following examples are provided to illustrate the invention, but are not intended to limit the scope thereof. All parts and percentages are by weight unless otherwise indicated.

Example 1

A 12V bipolar battery is built using two monopole plates (positive and negative) and 5 bipolar plates. The plates are manufactured using methods as described herein and Commonly owned patent application titled BIPOLAR BATTERY ASSEMBLY, Shaffer I I, et al. US 2010/0183920. In this example the plates are 197 mm by 173 mm and include four transverse channel holes. The plates are pasted using standard lead-acid active materials for the negative active material and positive active material. The battery is assembled by stacking onto four rods through the transverse channels. This ensures alignment of the plates. After each plate is placed four bushings are dropped onto the alignment rods. These bushings will establish the final compressed height of the separator. Absorbent glass mat separator is then stacked such that holes are cut into the separator to accommodate the bushings. This process is repeated for all of the cells. The assembly is compressed and secured with temporary bolts through the transverse channel. The battery is sealed on the edge by melt bonding a 2 mm thick ABS sheet to the edges of the bipolar plates. This is repeated for each of the four sides. After the edges are sealed the temporary restraining bolts are removed from the transverse channels. An ABS rod is inserted through the transverse channel with the rod extending past the end plates. The ABS rod is then heat-staked onto the end-plate to seal the channel and secure the battery to carry the compressive loads.

Upon assembly vent holes are drilled through the sealed membrane into each cell centrally located on the thickness of the absorbent glass mat separator. A manifold is then glued to the top of the battery assembly forming a common head space above the vent holes. In the manifold a single port is fabricated. The battery assembly is placed in a water tank and 4 psi of pressure is applied through the manifold port using helium gas. No leaks or bubbles were observed.

Through the port a vacuum is pulled to near 29 in-Hg. Vacuum is closed and a fill valve is opened allowing acid to fill all cells of the battery simultaneously. The battery is then formed using standard lead-acid battery formation procedures. After formation the battery is tested for open-cell voltage, capacity and resistance. In this example, the battery had an open circuit voltage (OCV) of 12.95V with a capacity at the 20 hour discharge rate of 18 Ah and a resistance of 20 milli-ohms.

In one set of experiments a pressure gauge is attached to the manifold port. The charged battery is placed in a water tank and a voltage is applied across the terminals. The voltage is varied from 14V to 16V. Pressure is monitored and increases with applied voltage due to oxygen and hydrogen gas production at the electrodes. At 16V the pressure indicated is 30 psi. No bubbles and leaks are observed.

Example 2

A second battery is built similar to Example 1. In this example the transverse channels are filled with an epoxy resin. A cap feature is molded on the ends of the resin on the end plate to assist in supporting the compressive load. After assembly the battery is pressure tested with helium at 4 psi while immersed in a water tank. No visible leaks are observed. As before the battery is filled with acid and formed. The battery exhibits an OCV of 12.93V, a 20 hour discharge capacity of 17.8 amp hour (Ah) and a resistance of 24 milliohms.

Example 3

A 96 volt battery is built using similar methods described in Example 1. The battery is built with a positive monopolar end assembly, a negative monopolar end assembly and 47 bipolar plates. In this example the transverse channels are tapped and a threaded plastic rod is inserted into the channels. The threaded rod extends past the monopole end plates. Similar to Example 1 the threaded rod is heat-staked to form the end-seal and secure compressive loads. After assembly the battery is pressure tested with 4 psi of helium; no leaks are observed. As before the battery is filled with acid and formed. The battery exhibits an OCV of 103.5V and a 20 hour capacity of 17 Ah.

Parts by weight as used herein refers to 100 parts by weight of the composition specifically referred to. Exemplary embodiments of the invention have been disclosed. A person of ordinary skill in the art recognizes that modifications fall within the teachings of this application. Any numerical values recited in the above application include all values from the lower value to the upper value in increments of one unit provided that there is a separation of at least 2 units between any lower value and any higher value. All possible combinations of numerical values between the lowest value and the highest value enumerated are to be considered to be expressly stated in this application. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An article containing electrochemical cells comprising:
    a) one or more stacks of battery plates comprising one or more bipolar plates comprising a substrate having an anode on one surface and a cathode on the opposite surface, a monopolar plate having a cathode deposited on one surface and a monopolar plate having an anode deposited on one surface, wherein the plates are arranged such that the surfaces of the plates having a cathode deposited on the surface face the surface of another plate having an anode deposited on the surface, and the monopolar plates are located at opposite ends of each stack of battery plates;
    b) located between each plate is a separator and a liquid electrolyte wherein the separator and the plates form sealed electrochemical cells; and
    c) the one or more stacks of battery plates having a plurality of channels passing transversely though the portion of the plates having the cathode and/or the anode deposited thereon and the liquid electrolyte and the separators of the electrochemical cells;
    wherein the plurality of channels are formed by a series of matched inserts and/or bosses in the battery plates and separators about the periphery of the channels which prevent the leakage of the liquid electrolyte into the channels, and posts located in one or more of the channels having on each end an overlapping portion that covers the channel and a sealing surface on the outside of the monopolar plates adjacent to the holes for the transverse channels and applies pressure on the sealing surfaces of the monopolar plates wherein the pressure is sufficient to withstand pressures created during assembly and operation of electrochemical cells created by the stacks of battery plates, wherein the posts are fabricated from a polymeric material;
    wherein the posts are molded in place and are bonded to the inside of the inserts and/or bosses that form the transverse channels.

2. An article according to claim 1 wherein the substrates of the monopolar and bipolar plates comprise sheets of thermoplastic polymer.

3. An article according to claim 1 wherein the overlapping portion is formed by molded polymeric material on the end of the posts.

4. An article according to claim 1 wherein the bipolar plates comprise polymeric substrates having a plurality of openings passing through the substrates in communication with both faces of the substrates wherein one or more of the openings are filled with a conductive material which is in contact with both faces of the substrates.

5. An article according to claim 1 wherein the substrates comprise one or more thermoset polymers with one or more thermoplastic polymers attached about the periphery of the thermoset polymers.

6. An article according to claim 1 wherein the separators comprise porous polymer films, glass mats or porous rubbers.

7. An article according to claim 1 wherein the posts comprise ABS (acrylonitrile butadiene styrene), polypropylene, polyester, thermoplastic polyurethanes, polyolefins, compounded thermoplastic resins or polycarbonates.

8. An article according to claim 1 which comprises a plurality of channels spaced to spread out compressive forces generated during operation of the article.

9. An article according to claim 1 wherein there are fewer posts than channels and the channels without posts are utilized as cooling channels or vent/fill channels.

10. An article according to claim 1 wherein at each end of the one or more stacks of battery plates is a mono-polar endplate and the mono-polar endplates can withstand pressures of up to about 10 psi or greater without damaging the monopolar end-plates.

11. An article according to claim 1 wherein the separators have an area that is greater than the area of the adjacent cathodes and anodes and edges of the separator preferably contact peripheral edges of the bipolar and monopolar plates which do not have the anodes or cathodes disposed thereupon so as to completely separate the anode portion of the electrochemical cells from the cathode portion of the electrochemical cells.

12. An article containing electrochemical cells comprising:
- a) one or more stacks of battery plates comprising one or more bipolar plates comprising a substrate having an anode on one surface and a cathode on the opposite surface, a monopolar plate having a cathode deposited on one surface and a monopolar plate having an anode deposited on one surface, wherein the plates are arranged such that the surfaces of the plates having a cathode deposited on the surface face the surface of another plate having an anode deposited on the surface, and the monopolar plates are located at opposite ends of each stack of battery plates;
- b) located between each plate is a separator and a liquid electrolyte wherein the separator and the plates form sealed electrochemical cells; and
- c) the one or more stacks of battery plates having a plurality of channels passing transversely though the portion of the plates having the cathode and/or the anode deposited thereon and the liquid electrolyte and the separators of the electrochemical cells;

wherein the plurality of channels are formed by a series of matched inserts and/or bosses in the battery plates and separators about the periphery of the channels which prevent the leakage of the liquid electrolyte into the channels, and posts located in one or more of the channels having on each end an overlapping portion that covers the channel and a sealing surface on the outside of the monopolar plates adjacent to the holes for the transverse channels and applies pressure on the sealing surfaces of the monopolar plates wherein the pressure is sufficient to withstand pressures created during assembly and operation of electrochemical cells created by the stacks of battery plates, wherein the posts are fabricated from a polymeric material;

wherein the inserts are molded into the separator.

13. An article according to claim 12 wherein the substrates of the monopolar and bipolar plates comprise sheets of thermoplastic polymer.

14. An article according to claim 12 wherein the overlapping portion is formed by molded polymeric material on the end of the posts.

15. An article according to claim 12 wherein the bipolar plates comprise polymeric substrates having a plurality of openings passing through the substrates in communication with both faces of the substrates wherein one or more of the openings are filled with a conductive material which is in contact with both faces of the substrates.

16. An article according to claim 12 wherein the substrates comprise one or more thermoset polymers with one or more thermoplastic polymers attached about the periphery of the thermoset polymers.

17. An article according to claim 12 wherein the separators comprise porous polymer films, glass mats or porous rubbers.

18. An article according to claim 12 wherein the posts comprise ABS (acrylonitrile butadiene styrene), polypropylene, polyester, thermoplastic polyurethanes, polyolefins, compounded thermoplastic resins or polycarbonates.

19. An article according to claim 12 wherein there are fewer posts than channels and the channels without posts are utilized as cooling channels or vent/fill channels.

20. An article according to claim 12 wherein the separators have an area that is greater than the area of the adjacent cathodes and anodes and edges of the separator preferably contact peripheral edges of the bipolar and monopolar plates which do not have the anodes or cathodes disposed thereupon so as to completely separate the anode portion of the electrochemical cells from the cathode portion of the electrochemical cells.

* * * * *

UNITED STATES PATENT AND TRADEMARK OFFICE
CERTIFICATE OF CORRECTION

PATENT NO. : 9,531,031 B2
APPLICATION NO. : 14/608584
DATED : December 27, 2016
INVENTOR(S) : Edward O. Shaffer et al.

It is certified that error appears in the above-identified patent and that said Letters Patent is hereby corrected as shown below:

On the Title Page

Page 2 FOREIGN PATENT DOCUMENTS

Delete "KR 10-2001-0097434 11/2001" and insert --KR 10-2001-0097437 11/2001--

Signed and Sealed this
Eighteenth Day of April, 2017

Michelle K. Lee
*Director of the United States Patent and Trademark Office*